US011048624B2

(12) United States Patent
Fischer et al.

(10) Patent No.: US 11,048,624 B2
(45) Date of Patent: Jun. 29, 2021

(54) METHODS FOR MULTI-STREAM GARBAGE COLLECTION

(71) Applicant: Samsung Electronics Co., Ltd., Suwon-si, Gyeonggi-do (KR)

(72) Inventors: Stephen G. Fischer, Mountain View, CA (US); Changho Choi, San Jose, CA (US); Jason Martineau, Milpitas, CA (US); Rajinikanth Pandurangan, Fremont, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 15/821,708

(22) Filed: Nov. 22, 2017

(65) Prior Publication Data

US 2018/0307598 A1 Oct. 25, 2018

Related U.S. Application Data

(63) Continuation-in-part of application No. 15/620,814, filed on Jun. 12, 2017, now Pat. No. 10,698,808.
(Continued)

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0643* (2013.01);
(Continued)

(58) Field of Classification Search
CPC .. G06F 12/0253; G06F 3/0679; G06F 3/0659; G06F 3/0608; G06F 12/0246;
(Continued)

(56) References Cited

U.S. PATENT DOCUMENTS 8,429,658 B2 4/2013 Auerbach et al.
8,688,894 B2 4/2014 Kuehne
(Continued)

FOREIGN PATENT DOCUMENTS

JP 2016095828 A 5/2016
JP 2016170583 A 9/2016
(Continued)

OTHER PUBLICATIONS

Office Action for U.S. Appl. No. 15/458,968, dated Apr. 10, 2018.
(Continued)

*Primary Examiner* — David Yi
*Assistant Examiner* — Zubair Ahmed
(74) *Attorney, Agent, or Firm* — Renaissance IP Law Group LLP

(57) ABSTRACT

A Solid State Drive (SSD) is disclosed. The SSD may include storage for data and a host interface logic to receive requests from a host machine. The SSD may also include an SSD controller to manage reading data from and writing data to the storage responsive to the requests. The SSD controller may include a flash translation layer to translate logical addresses to physical addresses, a garbage collection logic to perform garbage collection on an erase block that includes a valid page, a stream logic to manage stream characteristics for the data in the valid page, and a restreamer logic to assign the valid page to a new block based on the stream characteristics.

16 Claims, 13 Drawing Sheets

Related U.S. Application Data

(60) Provisional application No. 62/561,674, filed on Sep. 21, 2017, provisional application No. 62/490,027, filed on Apr. 25, 2017.

(52) U.S. Cl.
CPC .......... *G06F 3/0652* (2013.01); *G06F 3/0659* (2013.01); *G06F 3/0679* (2013.01); *G06F 12/0246* (2013.01); *G06F 2212/7201* (2013.01); *G06F 2212/7205* (2013.01); *G06F 2212/7211* (2013.01)

(58) Field of Classification Search
CPC ..... G06F 2212/7211; G06F 2212/7205; G06F 2212/7201; G06F 3/0643; G06F 3/0652
See application file for complete search history.

(56) References Cited

U.S. PATENT DOCUMENTS

| | | |
|---|---|---|
| 8,874,835 B1 | 10/2014 | Davis et al. |
| 8,886,880 B2 | 11/2014 | Barrell et al. |
| 9,158,687 B2 | 10/2015 | Barrell et al. |
| 9,459,810 B2 | 10/2016 | Benisty et al. |
| 9,594,513 B1 | 3/2017 | Delgado et al. |
| 9,854,270 B2 | 12/2017 | Ramasubramonian et al. |
| 10,095,613 B2 | 10/2018 | Jo et al. |
| 2009/0119352 A1 | 5/2009 | Branda et al. |
| 2012/0072798 A1 | 3/2012 | Unesaki et al. |
| 2012/0110239 A1 | 5/2012 | Goss et al. |
| 2012/0191900 A1 | 7/2012 | Kunimatsu et al. |
| 2013/0159626 A1 | 6/2013 | Katz et al. |
| 2014/0189270 A1 | 7/2014 | Iwanicki et al. |
| 2015/0169449 A1 | 6/2015 | Barrell et al. |
| 2015/0370630 A1 | 12/2015 | Yang |
| 2016/0162203 A1 | 6/2016 | Grimsrud |
| 2016/0179386 A1* | 6/2016 | Zhang ................... G06F 3/0679 711/103 |
| 2016/0253257 A1 | 9/2016 | Kim et al. |
| 2016/0266792 A1* | 9/2016 | Amaki ................ G06F 12/0246 |
| 2016/0283116 A1* | 9/2016 | Ramalingam ......... G06F 3/0602 |
| 2016/0283124 A1* | 9/2016 | Hashimoto ........... G06F 16/166 |
| 2016/0283125 A1 | 9/2016 | Hashimoto et al. |
| 2016/0291872 A1 | 10/2016 | Hashimoto et al. |
| 2016/0299715 A1 | 10/2016 | Hashimoto et al. |
| 2016/0306552 A1 | 10/2016 | Liu et al. |
| 2016/0313943 A1* | 10/2016 | Hashimoto ........... G06F 3/0659 |
| 2017/0031631 A1 | 2/2017 | Lee et al. |
| 2017/0075614 A1 | 3/2017 | Kanno |
| 2017/0153848 A1 | 6/2017 | Martineau et al. |
| 2018/0039448 A1 | 2/2018 | Harasawa et al. |
| 2018/0276118 A1* | 9/2018 | Yanagida ................ G06F 3/064 |

FOREIGN PATENT DOCUMENTS

| | | |
|---|---|---|
| KR | 20150028610 A | 3/2015 |
| KR | 101544309 B1 | 8/2015 |
| TW | 201510722 A | 3/2015 |
| TW | 201536038 A | 9/2015 |

OTHER PUBLICATIONS

Office Action for U.S. Appl. No. 15/620,814, dated Jun. 19, 2018.
Final Office Action for U.S. Appl. No. 15/458,968, dated Jul. 27, 2018.
Notice of Allowance for U.S. Appl. No. 15/458,968, dated Oct. 12, 2018.
Office Action for U.S. Appl. No. 15/620,814, dated Oct. 18, 2018.
Final Office Action for U.S. Appl. No. 15/620,814, dated Feb. 21, 2019.
Advisory Action for U.S. Appl. No. 15/620,814, dated May 13, 2019.
Office Action for U.S. Appl. No. 15/620,814, dated Jul. 17, 2019.
Final Office Action for U.S. Appl. No. 15/620,814, dated Sep. 18, 2019.
Office Action for U.S. Appl. No. 16/219,936, dated Oct. 4, 2019.
Notice of Allowance for U.S. Appl. No. 15/620,814, dated Feb. 26, 2020.
Notice of Allowance for U.S. Appl. No. 16/219,936, dated Apr. 2, 2020.
Notice of Allowance for U.S. Appl. No. 16/866,545, dated Feb. 19, 2021.
Office Action for U.S. Appl. No. 16/866,545, dated Sep. 23, 2020.
Kang, Jeong-Uk, et al., "The Multi-streamed Solid-State Drive," HotStorage 14, 6th USENIX Workshop on Hot Topics Storage and File Systems, Jun. 2014.

* cited by examiner

METHODS FOR MULTI-STREAM GARBAGE COLLECTION

RELATED APPLICATION DATA

This application claims the benefit of U.S. Provisional Patent Application Ser. No. 62/561,674, filed Sep. 21, 2017, which is incorporated by reference herein for all purposes.

This application is a continuation-in-part of U.S. patent application Ser. No. 15/620,814, filed Jun. 12, 2017, which claims the benefit of U.S. Provisional Patent Application Ser. No. 62/490,027, filed Apr. 25, 2017, both of which are incorporated by reference herein for all purposes.

This application is related to U.S. patent application Ser. No. 15/499,877, filed Apr. 27, 2017, which claims the benefit of U.S. Provisional Patent Application Ser. No. 62/458,566, filed Feb. 13, 2017, and U.S. Provisional Patent Application Ser. No. 62/471,350, filed Mar. 14, 2017; which is a continuation-in-part of U.S. patent application Ser. No. 15/344,422, filed Nov. 4, 2016, which claims the benefit of U.S. Provisional Patent Application Ser. No. 62/383,302, filed Sep. 2, 2016, and which is a continuation-in-part of U.S. patent application Ser. No. 15/144,588, filed May 2, 2016, which claims the benefit of U.S. Provisional Patent Application Ser. No. 62/245,100, filed Oct. 22, 2015 and U.S. Provisional Patent Application Ser. No. 62/192,045, filed Jul. 13, 2015; and which is a continuation-in-part of U.S. patent application Ser. No. 15/090,799, filed Apr. 5, 2016, which claims the benefit of U.S. Provisional Patent Application Ser. No. 62/245,100, filed Oct. 22, 2015 and U.S. Provisional Patent Application Ser. No. 62/192,045, filed Jul. 13, 2015, all of which are incorporated by reference herein for all purposes.

This application is related to U.S. patent application Ser. No. 15/458,968, filed Mar. 14, 2017, which claims the benefit of U.S. Provisional Patent Application Ser. No. 62/448,958, filed Jan. 20, 2017, and U.S. Provisional Patent Application Ser. No. 62/413,177, filed Oct. 26, 2016, all of which are incorporated by reference herein for all purposes.

This application is related to U.S. patent application Ser. No. 15/167,974, filed May 27, 2016, which claims the benefit of U.S. Provisional Patent Application Ser. No. 62/309,446, filed Mar. 16, 2016, both of which are incorporated by reference herein for all purposes.

This application is related to U.S. patent application Ser. No. 15/146,708, filed May 4, 2016, now allowed, which claims the benefit of U.S. Provisional Patent Application Ser. No. 62/302,162, filed Mar. 1, 2016, and is a continuation-in-part of Ser. No. 15/046,439, filed Feb. 17, 2016, now allowed, which claims the benefit of U.S. Provisional Patent Application Ser. No. 62/261,303, filed Nov. 30, 2015, all of which are incorporated by reference herein for all purposes.

FIELD

The inventive concepts relate generally to storage devices, and more particularly to improving garbage collection performance in storage devices.

BACKGROUND

Multi-streaming is an innovative Solid State Drive (SSD) controller technology that reduces or eliminates garbage collection in the SSD by storing associated data, or similar lifetime data, in the same erase block. Multi-streaming has been standardized in the T10 and Non-Volatile Memory Express (NVMe) standards organizations, and has been implemented by industry SSD manufacturers. Multi-streaming relies on hints from the host to indicate which data writes are associated with one another or have similar lifetimes.

Auto-streaming is an extension of the multi-streaming technology where an algorithm running in the SSD or host analyzes the incoming data writes and automatically makes a determination of which data writes are associated with one another or have similar lifetimes, and assigns streams accordingly.

A limitation of current implementations of multi-streaming and auto-streaming is that the particular stream ID for each data write is not written into storage with the data. So, if some data needs to undergo garbage collection, there is no knowledge of the original stream ID of that data and thus no way to associate it with other data.

A need remains for a way to improve the performance of garbage collection in storage devices using multi-streaming or auto-streaming.

DETAILED DESCRIPTION

Figure 1:
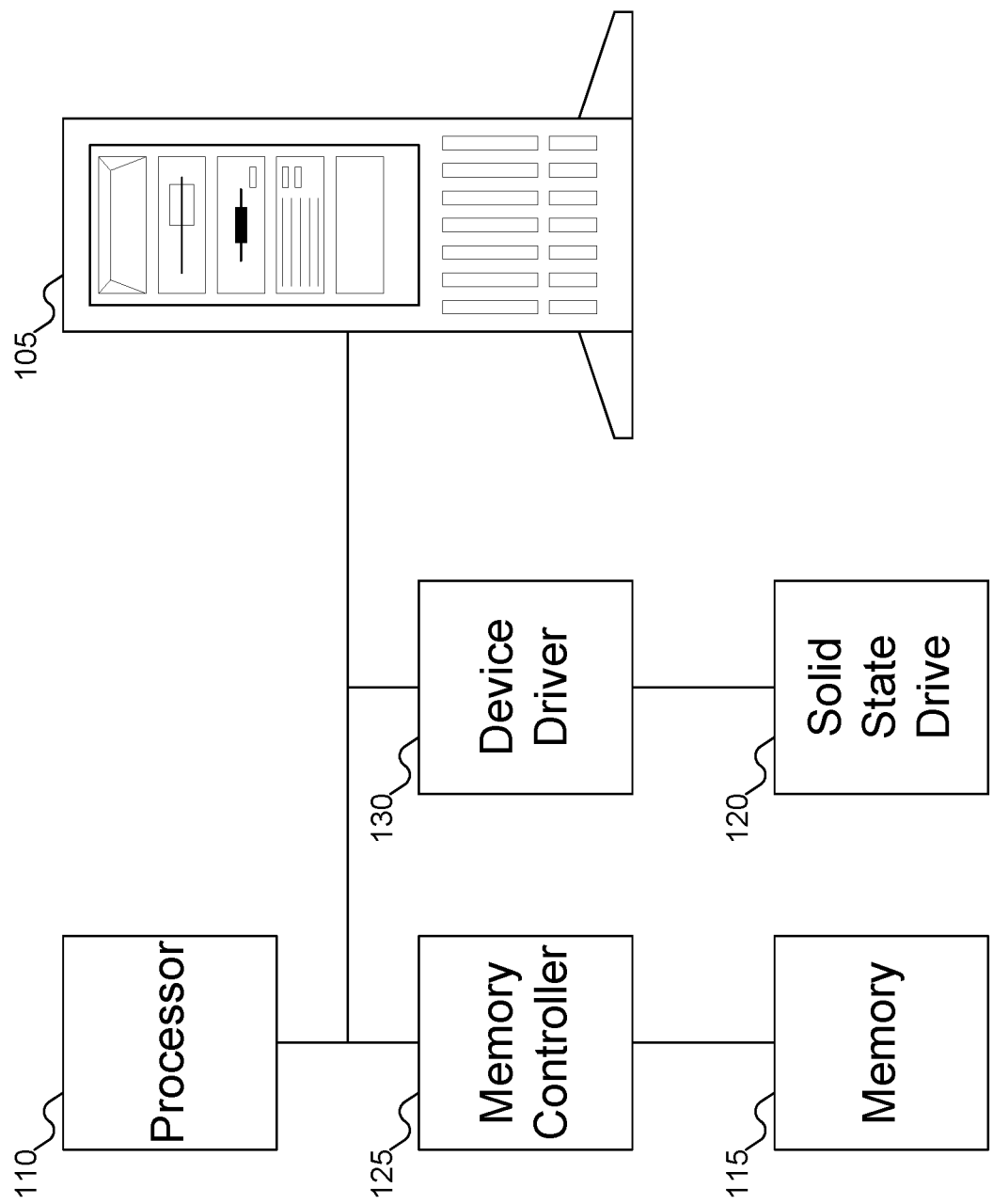
FIG. 1 shows a machine operative to a Solid State Drive (SSD) that may support garbage collection multi-streaming methods, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept define methods by which the stream identifier (ID) for data writes may be stored or recovered in a multi-stream capable Solid State Drive (SSD). The stored stream IDs/information are then available to be used when data later undergoes garbage collection to help group together associated data or data with similar lifetimes for storing in the same erased block.

Embodiments of the inventive concept also propose methods by which stream characteristics stored in flash could be used to find the best fit of stream ID for data undergoing garbage collection, in the case that the original stream ID for this data has been reused for a stream with new characteristics compared to those when the data was first written.

Several different methods are presented in which stream ID and/or stream characteristics could be recorded in flash when user data is first written to flash or when erase blocks are first allocated to a stream. If/when the data is later subject to programming during garbage collection, these recorded stream IDs and/or characteristics could be used to group together associated data or data with similar lifetimes for storing in the same erased block.

Method 1:

One possible use case for multi-stream capable SSDs is for host software (or hardware) to perform some stream classification algorithm that classifies all Input/Output (I/O) requests within the same address range "chunk" into the same stream ID, where a chunk is a fixed size region of the SSD's logical block address (LBA) space. For example, each 1 megabyte (MB) of address space could be considered a chunk. This is similar to how some auto-stream algorithms track I/O requests within each chunk of LBA space and identically classify all I/O requests within the same chunk.

As with auto-stream capable SSDs, the SSD may maintain a mapping table of chunk LBA range to Stream ID. For example, using chunks that are 1 MB in size and 512 byte blocks, the mapping might be implemented as follows:

e.g. (for 1 MB chunks and 512 byte blocks)
Chunk 0: LBA 0-2047→Stream ID 2
Chunk 1: LBA 2048-4095→Stream ID 0
Chunk 2: LBA 4096-6143→Stream ID 5
Chunk 3: LBA 6144-8191→Stream ID 7 and so on. Note that while the stream IDs are unique in the examples given, it is possible that the number of chunks may exceed the number of streams supported by the SSD. In that case, stream IDs may be reused. (Stream IDs might also be reused even if the SSD supports more streams than the number of chunks.)

Note that unlike with auto-stream capable SSDs, the SSD does not need to support an auto-stream algorithm to automatically classify incoming write requests into streams. Instead, the SSD may rely on host software or hardware to classify write requests into streams based on chunk address, and specify the corresponding stream ID to the SSD with the write request.

The SSD may store a persistent record of the "chunk-to-stream-id" mapping table to flash, to be loaded on boot-up and maintained/used during run time. This mapping table may be stored in the same way as other SSD metadata is, such as the bad block table.

The total space required to store the mapping table is 4 kilobytes (KB) per 1 terabyte (TB) of storage, assuming a 4-bit Stream ID per 1 MB chunk.

The "chunk-to-stream-id" mapping table maintained by the SSD may be used during the garbage collection process to maintain the grouping-together of associated data or data with similar lifetimes, specifically by grouping together in the same erase block data that has the same stream ID according to the chunk-to-stream-id mapping. This extends all the benefits of multi-stream SSDs for user writes (such as wear, write-amplification and garbage collection efficiency) through the lifetime of data stored on the SSD as data is moved multiple times through garbage collection.

Method 2:

One or more pages of each erase block may be dedicated to store erase-block level metadata including stream characteristics for data stored in the erase block. That way, if/when data from a given block is subject to garbage collection, the stored stream characteristics may be used to collocate the garbage collected data with other data having the same stream characteristics.

In Method 1, the stream ID corresponding to data in each erase block may be recorded in a page of each erase block. This stream ID may then be used during garbage collection to collocate data with the same stream IDs into the same erase block.

However, characteristics of streams are likely to change over time. For example, an application using a stream may close, and that stream ID may be assigned to a different application. As another example, an application using a stream ID may see a traffic change over its operative lifetime, so data lifetime characteristics may change over time. Therefore, some more detailed stream characteristics may be stored in a page of an erase block. If/when garbage collection occurs, these stored stream characteristics may be compared against the stream characteristics of all active streams. The SSD may then choose the most appropriate (best fit) current stream ID to which to map the data being garbage collected. This requires either that some stream characteristics of each stream are communicated from host to SSD, or that an auto-streaming functionality is running on the SSD to infer the characteristics from the received data streams.

Some stream characteristics that could be stored in the first page of every block include:

Stream ID.

Expected lifetime of data (such as whether data is considered hot or cold).

Stream timestamp for when stream was opened (when the stream characteristics were first recorded for this stream). This may help distinguish between current stream data and expired stream data with the same stream ID after a stream ID is reused with different stream characteristics.

Block allocation timestamp for when a block was allocated to this stream.

Sequentiality (an indication whether requests within the same stream are sequential).

Typical I/O size.

Expected capacity of stream (could be indefinite or unknown).

Bandwidth requirements, bit rate of stream.

Latency requirements.

Level of isolation (for I/O determinism): does the stream need to have its data isolated from other data by channel, die, plane, or block level, or none.

As noted above, one possible stream characteristics is a "block allocation timestamp", which may be recorded as each block is allocated to a stream for user writes. When data in a block is garbage collected for the first time after being written by the user, the lifetime (so far) of the data may be computed as the time difference between the recorded block allocation timestamp and the current time. If this lifetime so far exceeds the expected lifetime of the (current) stream, then the data could potentially be reclassified into a different stream with longer expected lifetime. This process could then be extended by recording the timestamp that a block is allocated for garbage collection writes to a stream with a certain expected lifetime, and perhaps also recording the approximate lifetime so far for data being garbage collected into this block.

As stream characteristics change over time and stream IDs are reused, a combination of Stream ID and Stream timestamp may be used as a qualifier for associating like data during garbage collection. When garbage collecting data that is discovered (by comparing Stream timestamp) to have been stored for a now expired stream ID, such data could be stored into one (or one of a few) generic streams based on stream characteristics. Alternatively, such data could be mapped into a best-fit stream based on comparing stream characteristics stored in the first page of the erase block to the stream characteristics of the current streams.

Method 3:

Another option is to optimally select an erase block to allocate to a given stream for garbage collection based on comparing certain stream characteristics (stored persistently as per above) of the data undergoing garbage collection to the wear (program-erase cycles) of available erased blocks.

For example, when selecting an erase block to allocate to a given stream, the SSD might choose an erase block whose wear (erase cycles) best matches the relative expected lifetime characteristic of the particular stream. For example, erase blocks with relatively low erase counts might be allocated to streams with hot data (short expected lifetime), where hot here means in terms of write frequency. Similarly, erase blocks with relatively high erase counts might be allocated to streams with cold data (long expected lifetime). In this manner, the wear of the individual blocks might even out over time.

FIG. 1 shows a machine operative to a Solid State Drive (SSD) that may support garbage collection multi-streaming methods, according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors, each of which may be single core or multi-core processors. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be controlled by memory controller 125, also part of machine 105.

Storage device 120 may be any variety of storage device that performs garbage collection. While embodiments of the inventive concept may focus on SSDs, embodiments of the inventive concept may also apply to other forms of storage: for example, shingled hard disk drives. Storage device 120 may be controlled by device driver 130, which may reside within memory 115.

Figure 2:
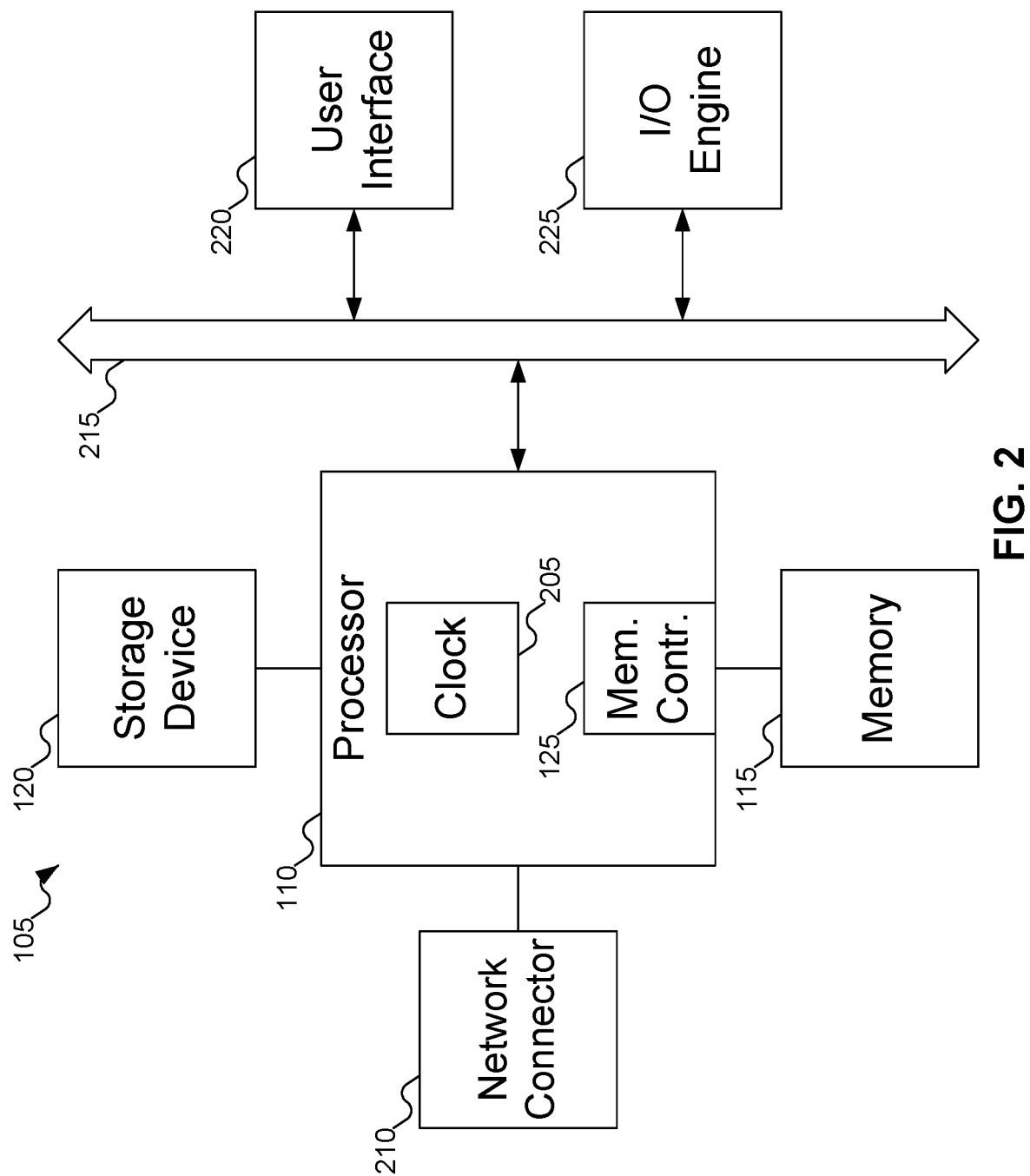
FIG. 2 shows additional details of the machine of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

Figure 3:
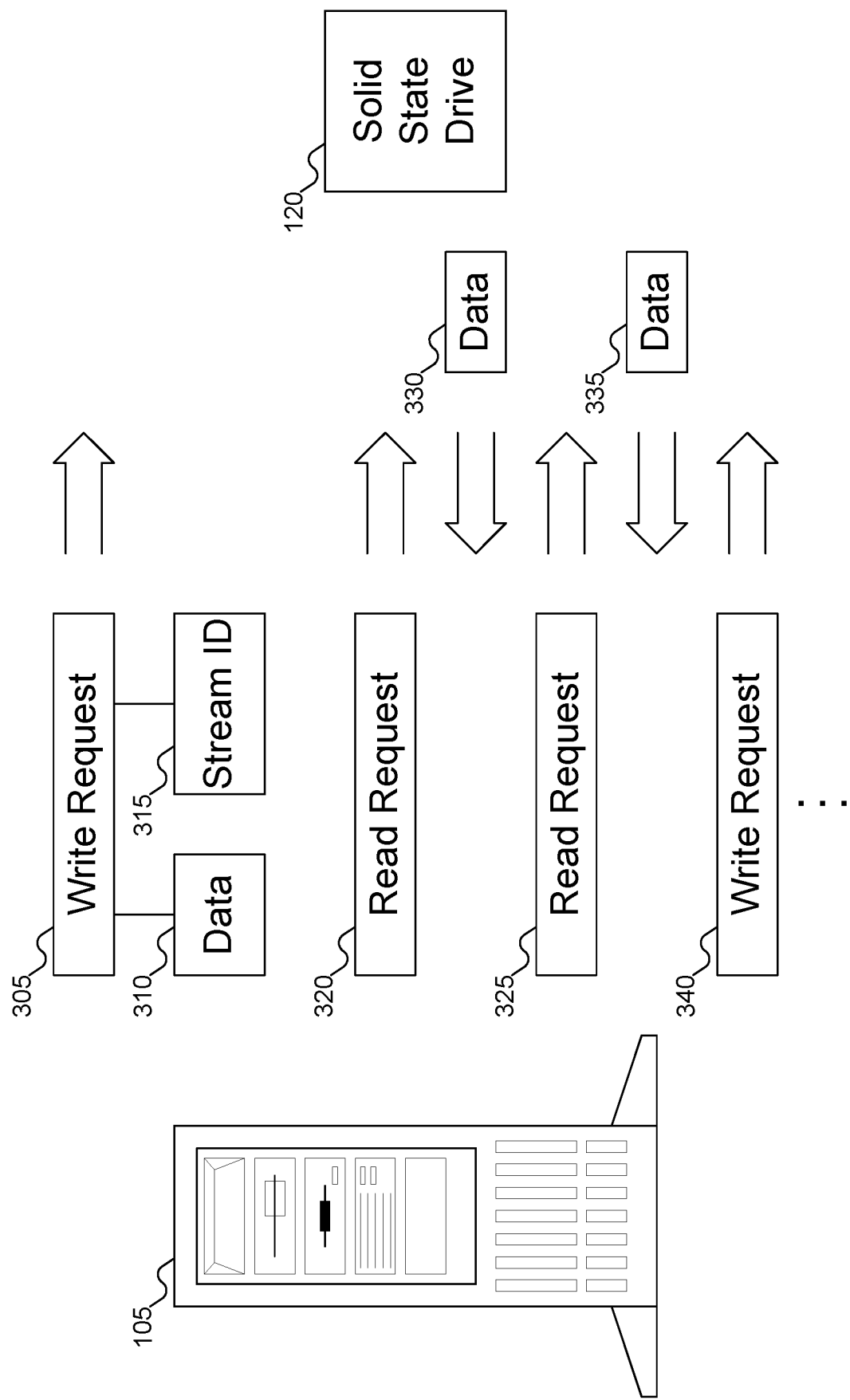
FIG. 3 shows the machine of FIG. 1 sending Input/Output (I/O) requests to the SSD of FIG. 1.

FIG. 3 shows machine 105 of FIG. 1 sending Input/Output (I/O) requests to SSD 120 of FIG. 1. In FIG. 3, machine 105 is shown sending write request 305 to SSD 120. Write request 305 may include data 310 and stream ID 315, which may be assigned by machine 105. Note that stream ID 315 might be assigned by the application that originated write request 305, or it might be assigned by machine 105 using its own form of auto-streaming: embodiments of the inventive concept are independent of how stream ID 315 is assigned to write request 305. Machine 105 is also shown as sending read requests 320 and 325, to which SSD 120 is shown as sending data 330 and 335 in response, and write request 340. Details of read requests 320 and 325 and write request 340 are not shown: read requests 320 and 325 are conventional read requests, and write request 340 would be similar to write request 305. While FIG. 3 shows machine 105 sending two write requests 305 and 340 and two read requests 320 and 325, embodiments of the inventive concept may extend to any number of read and write requests, and with the number of read and write requests being different.

FIG. 3 shows an embodiment of the inventive concept where stream ID 315 is assigned at host machine 105. In other embodiments of the inventive concept, host machine 105 may send requests 305 and 340 without attaching stream ID 315, leaving it up to an auto-streaming mechanism in SSD 120 to assign streams to data.

Figure 4:
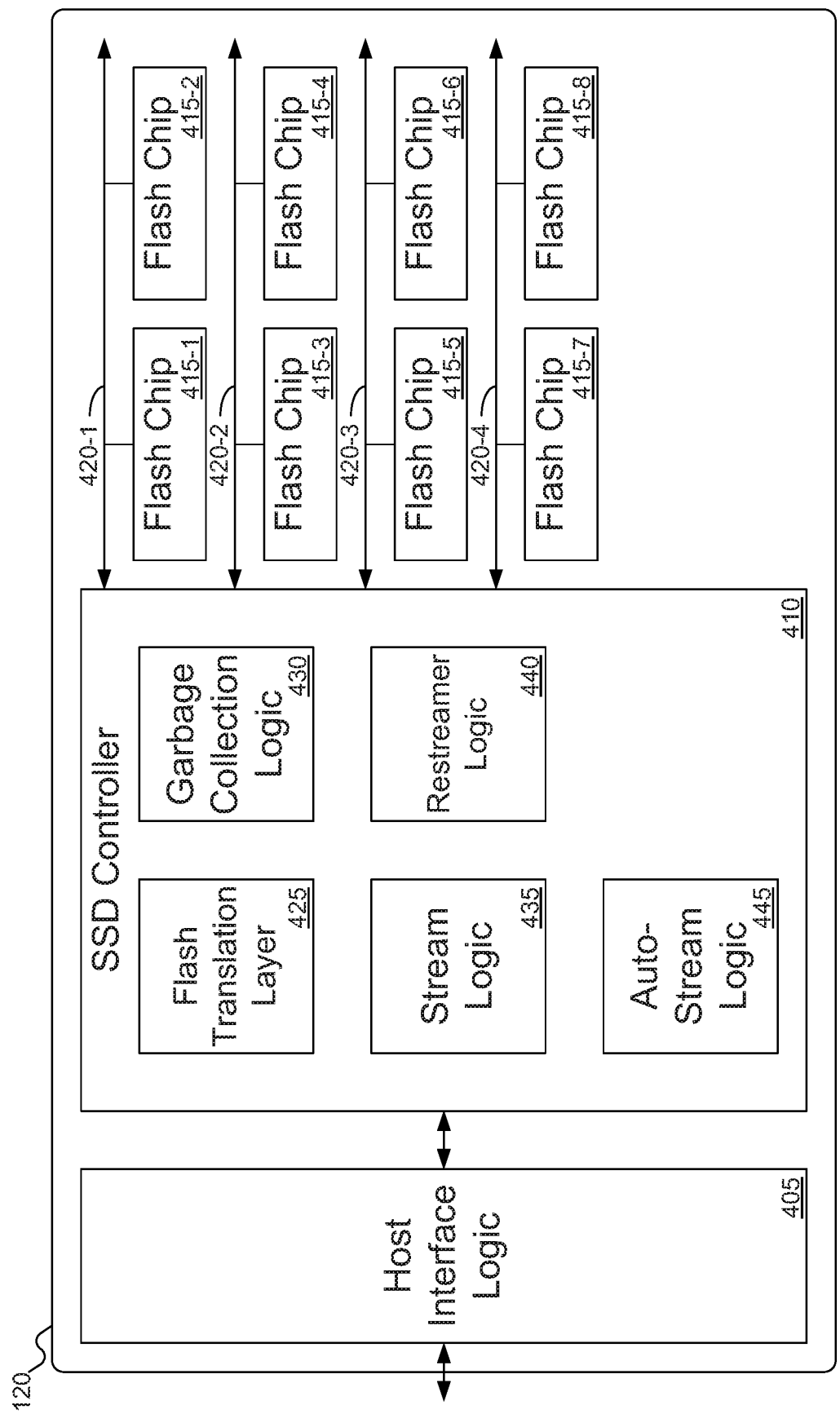
FIG. 4 shows details of the SSD of FIG. 1.

FIG. 4 shows details of SSD 120 of FIG. 1. In FIG. 4, SSD 120 may include host interface logic 405, SSD controller 410, and various flash memory chips 415-1 through 415-6, which may be organized into various channels 420-1 through 420-7. Host interface logic 405 may manage communications between SSD 120 and machine 105 of FIG. 1. SSD controller 410 may manage the read and write operations, along with garbage collection operations, on flash memory chips 415-1 through 415-6.

SSD controller 410 may include flash translation layer 425 and garbage collection logic 430 to perform some of this management. Flash translation layer 425 may perform the conventional functions of translating logical block addresses (LBAs), as used by machine 105 of FIG. 1, into physical block addresses (PBAs) of data stored in SSD 120. Garbage collection logic 430 may perform garbage collection on SSD 120: garbage collection logic 430 may identify erase blocks that should be subject to garbage collection, program any valid pages remaining in those erase blocks, and then erase the pages in the erase block, thereby freeing up those pages for reuse.

To support the operations of garbage collection logic 430, SSD controller 410 may also include stream logic 435 and restreamer logic 440. Stream logic 435 may manage the stream characteristics of data that has been written to SSD 120, and restreamer logic 440 may identify a new stream to which a valid page should be assigned when that valid page is being programmed as part of garbage collection. In embodiments of the inventive concept where host machine 105 of FIG. 1 does not provide stream IDs, such as stream ID 315 of FIG. 3, with write requests, such as write request 305 of FIG. 3, SSD controller 410 may also include auto-stream logic 445 to manage automatic stream assignment of write requests. Auto-stream logic 445 may determine a stream ID, such as stream ID 315 of FIG. 3, that may be assigned to the data to assist SSD 120 in storing the data in an appropriate block.

While FIG. 4 shows SSD 120 as including eight flash memory chips 415-1 through 415-8 organized into four channels 420-1 through 420-4, embodiments of the inventive concept may support any number of flash memory chips organized into any number of channels.

In FIG. 4, the various logics—host interface logic 405, garbage collection logic 430, stream logic 435, and restreamer logic 440—may be implemented in any desired manner. The logics may be implemented in custom hardware or using software (such as firmware) running on an appropriate processor within SSD 120 (which in turn may be a custom processor specially designed for use in storage devices, or a general purpose central processing unit that might be found in, for example, machine 105 of FIG. 1). If implemented as software, the logics may be stored in appropriate storage in SSD 120 (not shown in FIG. 4). In addition, each logic may be implemented independently of the others: some logics might be implemented in hardware and others implemented in software, in any desired combination.

Flash memory, such as SSD 120, is typically divided into pages, which the page being the smallest unit of data that may be read or written (although the amount of data involved in any individual I/O request might span multiple pages). These pages are grouped into blocks (which may, in turn, be grouped into superblocks). Thus, when data is written, machine 105 sends a write request (such as write request 305 of FIG. 3) that contains all the data to be written to a page (and possible multiple pages), along with the LBA associated with that data. One or more pages are then selected from those available and the data is written to the selected pages. Flash translation layer 425 is then updated to identify the specific physical block address (PBA) where the data is stored: that PBA is associated with the provided LBA. Similarly, when data is to be read, a read request (such as read request 320 of FIG. 3) is sent that includes an LBA to be retrieved. Flash translation layer 425 is consulted to determine the PBA corresponding to that LBA, and the data is then retrieved and returned.

When an application is finished using data, the application may instruct the flash memory to delete (or invalidate) the data. When SSD 120 receives a request to invalidate the data at a particular LBA, flash translation layer 425 is consulted to determine the PBA corresponding to the LBA. The page containing that PBA is then invalidated, so that the page may be erased when garbage collection is performed.

Flash memory supports updating data: that is, changing the data stored in a particular page. But flash memory may not be overwritten with new data, as may a conventional hard disk drive. Instead, the original page is invalidated and the updated data is written to a new page on SSD 120. Flash translation layer 425 is then updated to associate the new PBA with the original LBA.

Unlike I/O requests, which typically operate on pages, garbage collection is performed at the block level. When a block is erased, all the pages in that block are erased. Thus, if a block that is selected for garbage collection contains some valid data, that valid data needs to be copied to another page in SSD 120 before the block is erased. (Some SSDs perform garbage collection on superblocks, which as noted above are a set of blocks, but other than the fact that more than one block is being erased at a time, the differences between performing garbage collection on individual blocks vs. superblocks is not significant.)

As may be seen from the above description, pages on SSD 120 have one of three states: free (available to be written), valid (containing data that is being used), or invalid (containing data that is no longer being used, but not yet erased) (the exact names used for these states is not relevant). Ideally, when a block is selected for garbage collection, all the pages in that block are in the invalid state, which would mean that no valid data needs to be programmed to new pages. But in practice, it is not always possible to wait until a block has no valid pages before performing garbage collection. For example, consider the situation where every block contains at least one valid page but no free pages. In that situation, the SSD would be stuck, with pages that are not storing valid data, but unable to write new data, or even copy valid data from one page to another. (In actuality, this situation may be overcome by the SSD reserving some blocks just to have somewhere valid data may be stored while invalid pages are freed.)

Figure 5:
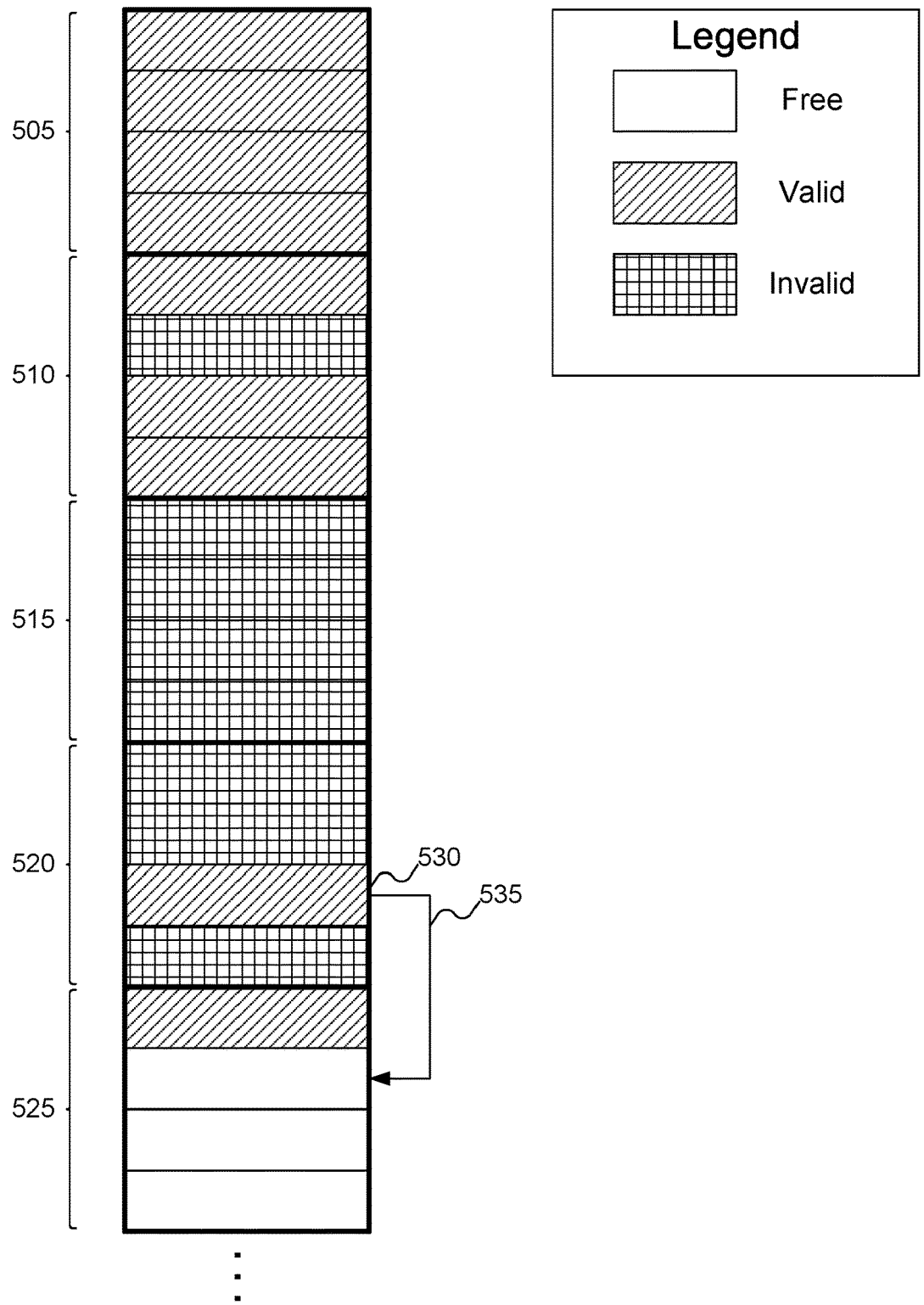
FIG. 5 shows pages and blocks of storage in the SSD of FIG. 1.

FIG. 5 illustrates how garbage collection may be performed in SSD 120 of FIG. 1. In FIG. 5, the storage within flash memory chip 415-1 is shown, but FIG. 5 is equally applicable to any other flash memory chip within SSD 120 of FIG. 1 or even to SSD 120 of FIG. 1 more generally (rather than looking at the lower level hardware implementation).

In FIG. 5, flash memory chip 415-1 is shown as being divided into blocks 505, 510, 515, 520, and 525. Each of blocks 505-525 shown in FIG. 5 includes four pages, but embodiments of the inventive concept may support any number of blocks including any number of pages (although typically each block includes the same number of pages). Block 505 contains four pages of valid data, and thus is a poor choice for garbage collection. Block 510 contains three valid pages and one invalid page, and is also a poor choice for garbage collection (but better than block 505, since at least one invalid page in block 510 may be freed). Block 515 contains only invalid pages, and thus is an ideal candidate for garbage collection (there is no valid data that would need to be programmed).

Block 520, however, is the most interesting block (for purposes of embodiments of the inventive concept). Block 520 contains three pages of invalid data and one page of valid data 530. As such, block 520 is a good candidate for garbage collection (although admittedly not as good as block 515, since valid page 530 would require programming). The question is where to place valid page 530. Valid page 530 might simply be programmed into any available free page, such as a free page in block 525, as shown by arrow 535) But other blocks might be a better choice, based on information about the stream from which valid page 530 was written.

Figure 6:
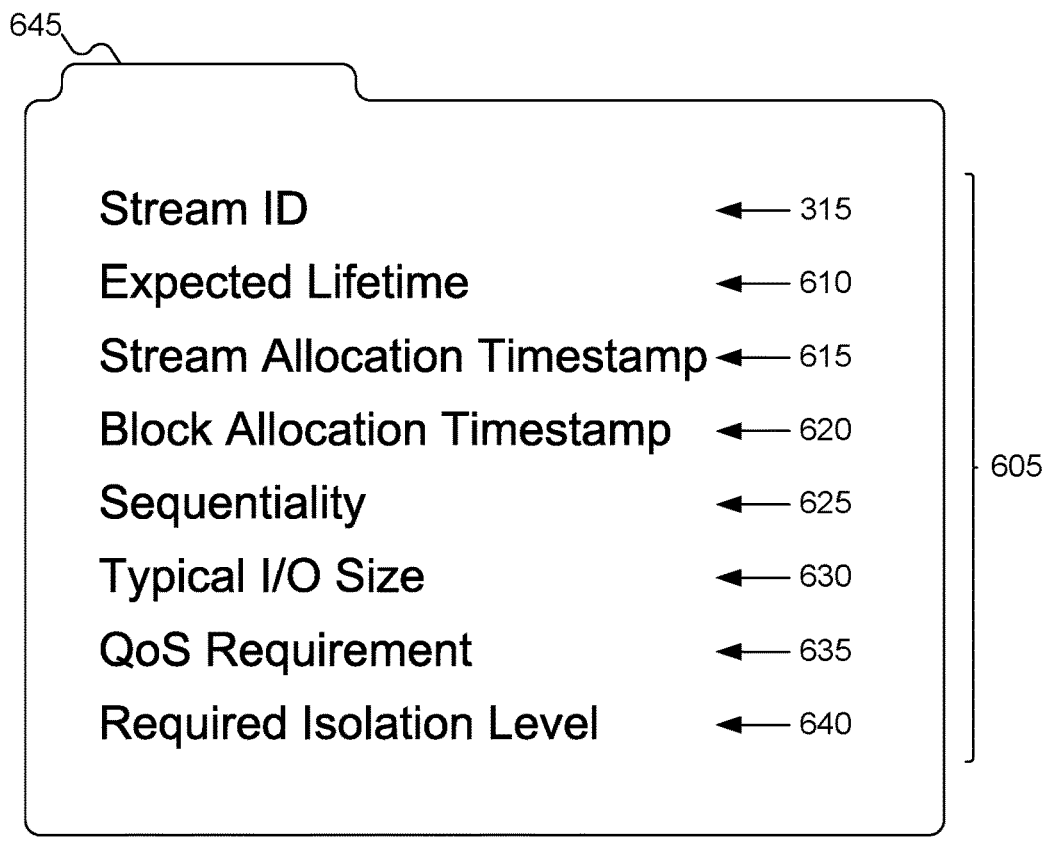
FIG. 6 shows details of stream characteristics for streams that may be stored in the SSD of FIG. 1.

FIG. 6 shows details of stream characteristics for streams that may be stored in SSD 120 of FIG. 1. Examples of stream characteristics 605 that may be tracked and stored include:

Stream ID 315, identifying the stream that included the data.

Expected lifetime 610 of the data. Expected lifetime 610 may be measured in units of time (for example, that data is expected to be stored on SSD 120 of FIG. 1 for 10 seconds before it will be invalidated) or in terms of whether the data is "hot" or "cold", "hot" meaning that the data has a short lifetime and "cold" meaning that the data has a long lifetime. Expected lifetime 610 may also measure the life of the data in degrees of "hotness" or "coldness", as desired.

Stream timestamp 615 for when stream was opened (when the stream characteristics were first recorded for this stream). That is, stream timestamp 615 may specify a time at which machine 105 of FIG. 1 first started writing data to this stream, at least, with respect to its current use by machine 105 of FIG. 1. For example, an application running on machine 105 of FIG. 1 might start writing data to a particular stream ID. When the application terminates, the stream is effectively "closed". Then, another application running on machine 105 of FIG. 1 might start using this stream ID. By using stream timestamp 615 in addition to stream ID 315, SSD 120 of FIG. 1 may distinguish between different "streams" that use the same stream ID.

Block allocation timestamp 620 for when a block was allocated to this stream. That is, block allocation timestamp 620 may specify the time which a particular block was selected to store data for the stream. Block allocation timestamp 620 could also be replaced with a page allocation timestamp 620, if desired, although this increases the amount of data that would need to be stored (since each page would need its own stream characteristics). The combination of block allocation timestamp 620 and stream timestamp 615 may be useful in determining whether stream characteristics 605 describe a stream still in use. For example, if block allocation timestamp 620 is before stream timestamp 615, then SSD 120 of FIG. 1 knows that stream ID 315 has been reallocated since the block was assigned to the stream. (Unfortunately, the inverse conclusion is not necessarily accurate: even if block allocation timestamp 620 is after stream timestamp 615, the stream might have been reopened since stream characteristics 605 were generated.)

Sequentiality 625 (an indication whether requests within the same stream are sequential). Sequential accesses may be helpful in optimizing how data is stored and retrieved, and may be suggestive about when data will be invalidated.

Typical I/O size 630. For example, typical I/O size 630 might indicate that data is typically written or read as more than one page at a time, which may be useful in optimizing how data is stored.

Quality of Service (QoS) requirements 635, such as the bandwidth used in I/O requests for the stream, or latency requirements for data written or read by the stream.

Level of isolation 640 (for I/O determinism), which may indicate whether the stream needs to have its data isolated from other data by channel, die, plane, or block level, or none. Level of isolation 640 may be helpful in optimizing how data is stored on SSD 120 of FIG. 1.

In some embodiments of the inventive concept, stream characteristics 605 may be stored as metadata on SSD 120 of FIG. 1. For example, for a block (such as blocks 505-525 of FIG. 5), one page may be reserved to store stream characteristics 605. In such embodiments of the inventive concept, stream characteristics 605 may be stored as stream page 645 as a page in a block on SSD 120 of FIG. 1. If data for more than one stream is stored in the block on SSD 120 of FIG. 1, then a portion of stream page 645 may store a mapping from an identifier of the page within the block to the stream associated with that page: for example, in a table in stream page 645. Storing this mapping from page identifier to stream ID in stream page 645 enables a quick determination of the stream used to write the data in the page, which in turn enables quick determination of stream characteristics 605 for that stream. (Of course, stream page 645 may store stream characteristics 605 for each page separately without including this additional mapping layer. But storing stream characteristics 605 directly for each page in the block may result in redundant information being stored in stream page 645 if the block contains more than one page of data from any given stream, which is likely.)

Figure 7:
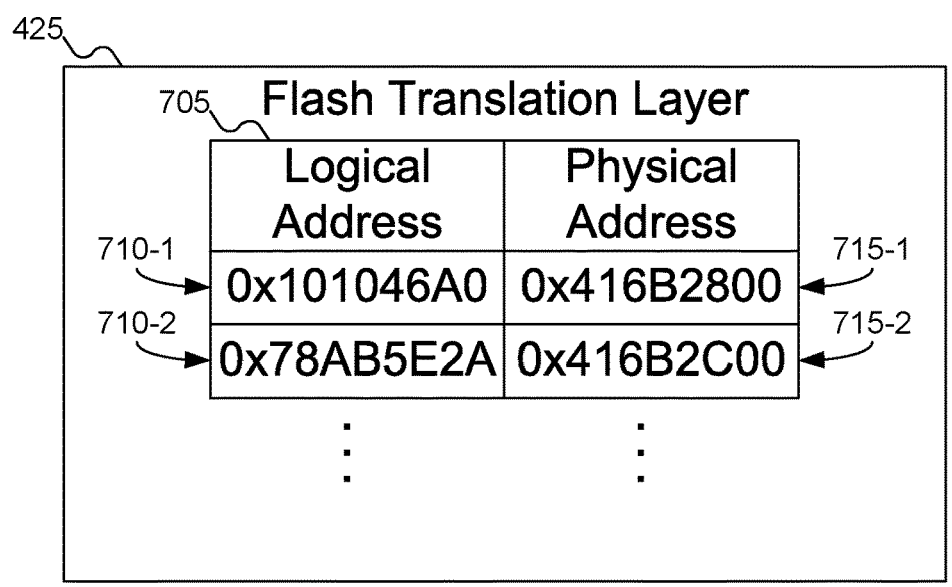
FIG. 7 shows a logical block address to physical block address table in the flash translation layer of FIG. 4.

FIG. 7 shows a logical block address to physical block address table in flash translation layer 425 of FIG. 4. In FIG. 7, LBA-to-PBA table 705 is shown. LBA-to-PBA table 705 is shown as pairing LBA 710-1 with PBA 715-1, and LBA 710-2 with PBA 715-2. While FIG. 7 shows LBA-to-PBA table 705 as including only two LBA/PBA pairs, embodiments of the inventive concept may support any number of LBA/PBA pairs.

LBA-to-PBA table 705 may be used conventionally by flash translation layer to determine the page (based on physical address) where data requested by an application (via a read request, such as read requests 320 and 325 of FIG. 3) may be found. But LBA-to-PBA table 705 may also be used in reverse: to determine the LBA associated with the PBA. For example, consider a valid page, such as valid page 530 of FIG. 5, that needs to be programmed during garbage collection. Given valid page 530 of FIG. 5, SSD 120 of FIG. 1 may determine the PBA of valid page 530 of FIG. 5. This PBA may then be mapped to an LBA using LBA-to-PBA table 705. Given the LBA, SSD 120 of FIG. 1 may then determine information about the stream that was used to write valid page 530, as described below with reference to FIG. 8.

Figure 8:
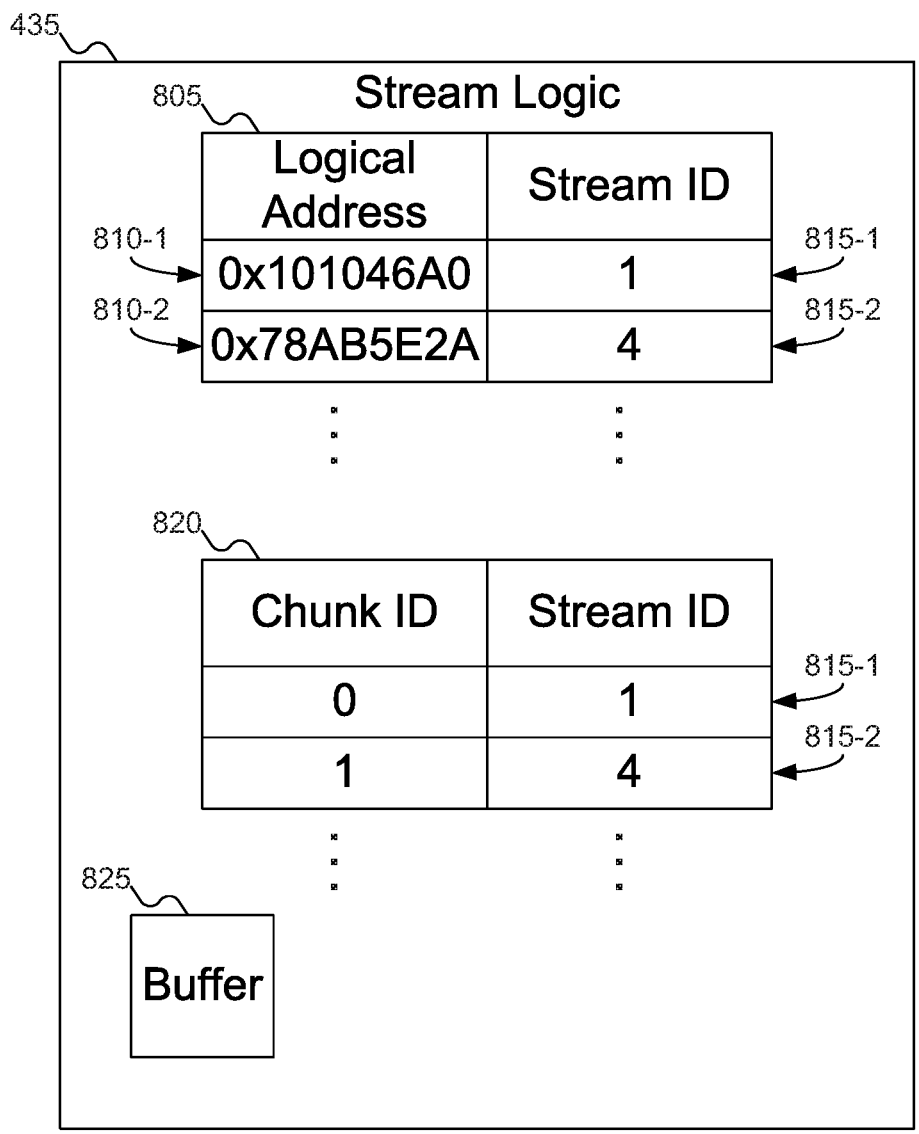
FIG. 8 shows details about the stream logic of FIG. 4.

FIG. 8 shows details about stream logic 435 of FIG. 4. In FIG. 8, stream logic 435 may include logical address-to-stream ID table 805. Logical address-to-stream ID table 805 may associate LBAs with the IDs of the stream that wrote that data. Thus, for example, logical address-to-stream ID table 805 pairs LBA 810-1 with stream ID 815-1, and LBA 810-2 with stream ID 815-2. While FIG. 8 shows logical address-to-stream ID table 805 as including only two LBA/stream ID pairs, embodiments of the inventive concept may support any number of LBA/stream ID pairs. Thus, given the LBA of valid page 530 of FIG. 5 (as described above with reference to FIG. 7), SSD 120 of FIG. 1 may use logical address-to-stream ID table 805 to determine the stream ID associated with the data in valid page 530 of FIG. 5. This stream ID may then be used by restreamer logic 440 of FIG. 4 to select a new block to program valid page 530 of FIG. 5.

Alternatively, instead of storing logical address-to-stream ID table 805, stream logic 435 may include chunk-to-stream ID table 820. Chunk-to-stream ID table 820 provides an alternative way to identify the stream used to write valid page 530 of FIG. 5. Given a particular LBA, a chunk may be determined. For example, if each chunk is 1 MB in size, then the 20 low-order bits may be removed from the LBA to determine the chunk. Then, using the chunk, the stream ID may be determined. As described above, if each chunk is 1 MB in size and each stream ID is 4 bits, then the total storage required for chunk-to-stream ID table 820 is only 4 KB for each 1 TB of data storage in SSD 120 of FIG. 1. In other embodiments of the inventive concept, with different chunk sizes and different numbers of bits needed per stream ID, the storage requirements for chunk-to-stream ID table 820 may differ.

As described above with reference to FIG. 6, stream characteristics 605 of FIG. 6 may be stored in stream page 645 of FIG. 6. If each block is allocated to a different stream, then stream page 645 of FIG. 6 may be written to the block as soon as the block is allocated to the stream. But in some embodiments of the inventive concept, pages from multiple streams may be written to a single block. In that situation, all the pertinent stream characteristics might not be known when the first page is written to the block. In such situations, buffer 825 may be used.

Figure 9:
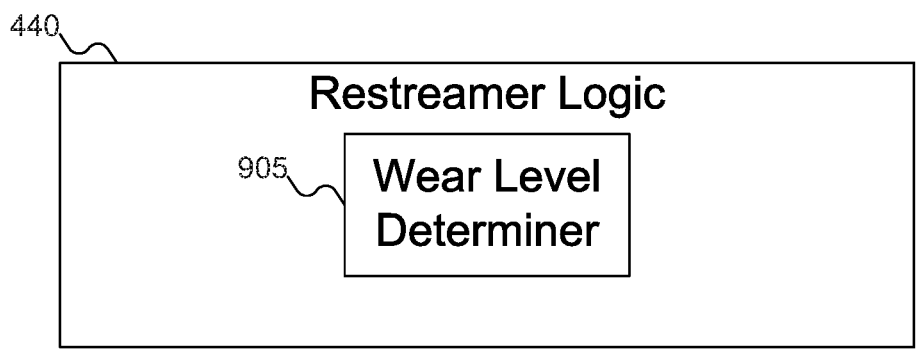
FIG. 9 shows details about the restreamer logic of FIG. 4.

Buffer 825 may store stream page 645 of FIG. 6 until all different streams that have data written to the block are known. In such embodiments of the inventive concept, stream page 645 of FIG. 6 may store multiple stream characteristics 605 of FIG. 6 for multiple streams. Stream page 645 of FIG. 6 may also store information identifying, for each page in the block, the streams from which those pages originated. Once all the stream characteristics that pertain to the block are known, stream page 645 of FIG. 6 may be written from buffer 825 into a page in the block. Embodiments of the inventive concept may support writing stream page 645 of FIG. 6 to any page in the block: the first page, the last page, or any page in between. FIG. 9 shows details about restreamer logic 440 of FIG. 4. In FIG. 9, restreamer logic 440 may use stream information—be it stream ID 315 of FIG. 6 or stream characteristics 605 of FIG. 6—to select an appropriate block to program valid page 530 of FIG. 5. If the stream from which valid page 530 of FIG. 5 is still open, then restreamer logic 440 may simply select a block assigned to the stream to program valid page 530 of FIG. 5. On the other hand, if the stream from which valid page 530 of FIG. 5 has been closed (and possibly reused), then restreamer logic 440 may use stream characteristics 605 of FIG. 6 to identify an open stream that has similar properties to the stream from which valid page 530 of FIG. 5 was written. In either case, valid page 530 of FIG. 5 is hopefully written to a block that contains other data with similar characteristics.

While conventional hard disk drives may be written and rewritten almost infinitely, blocks in flash memory tend to have finite limits on how many times they may be written and erased. As such, flash memory devices may determine the wear level of blocks and attempt to write data to pages that have been written and erased fewer times. Embodiments of the inventive concept may also consider the wear level of blocks in SSD 120 of FIG. 1 in selecting where to program valid page 530 of FIG. 5.

Restreamer logic 440 of FIG. 4 may also include wear level determiner 905. Wear level determiner 905 may determine the wear level of various blocks in SSD 120 of FIG. 1. Then, restreamer logic 440 may factor in both stream characteristics 605 of FIG. 6 and the wear levels of the various blocks. Restreamer 440 may write hot data (that is, data that has a short expected lifetime) to blocks with low wear levels, and cold data (that is, data that has a long expected lifetime) to blocks with high wear levels. In so doing, restreamer logic 440 may attempt to even out the wear on blocks in SSD 120 of FIG. 1.

Figure 10A:
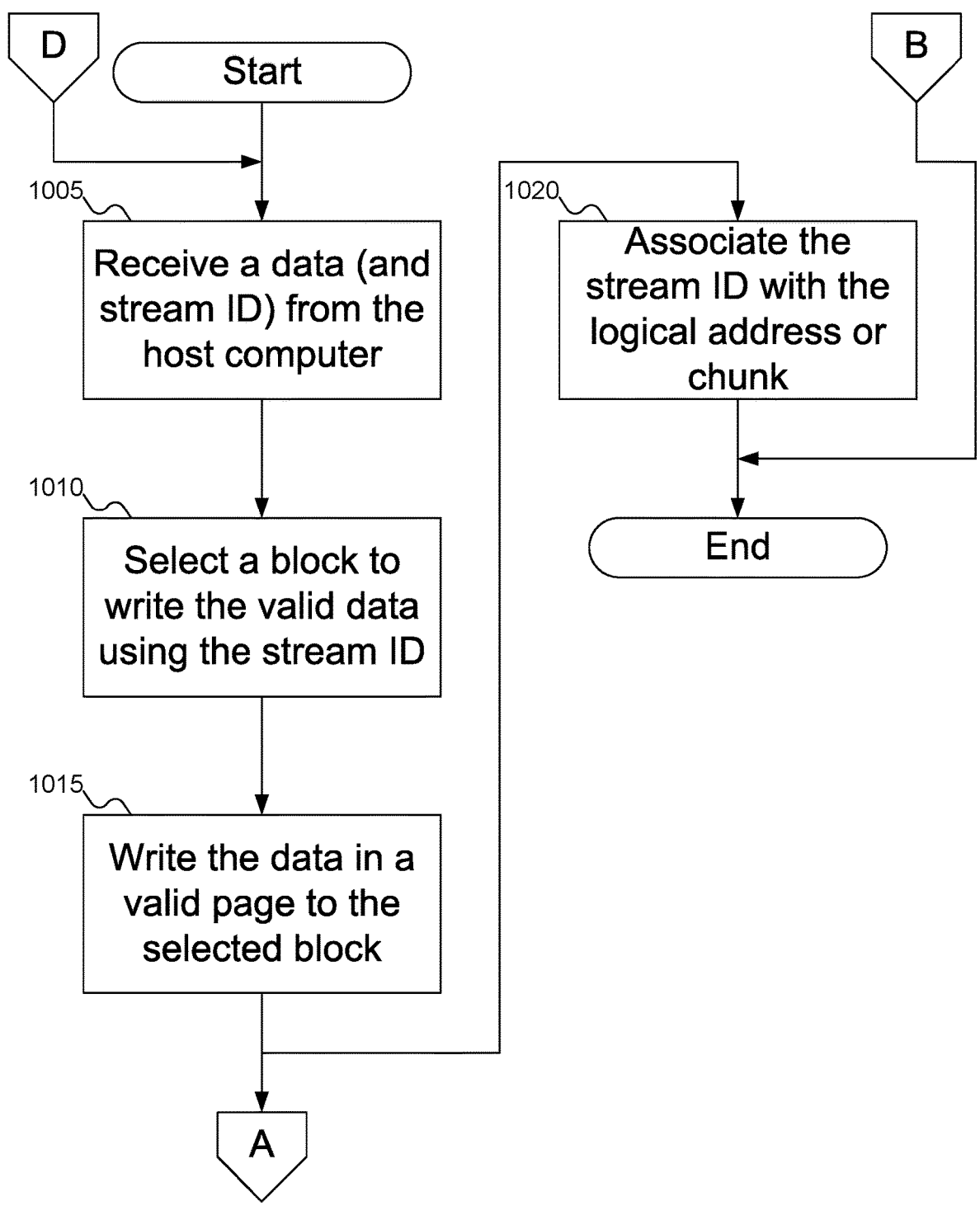
FIGS. 10A-10C show a flowchart of an example procedure to write data to the SSD of FIG. 1 and store stream information, according to an embodiment of the inventive concept.
Figure 10B:
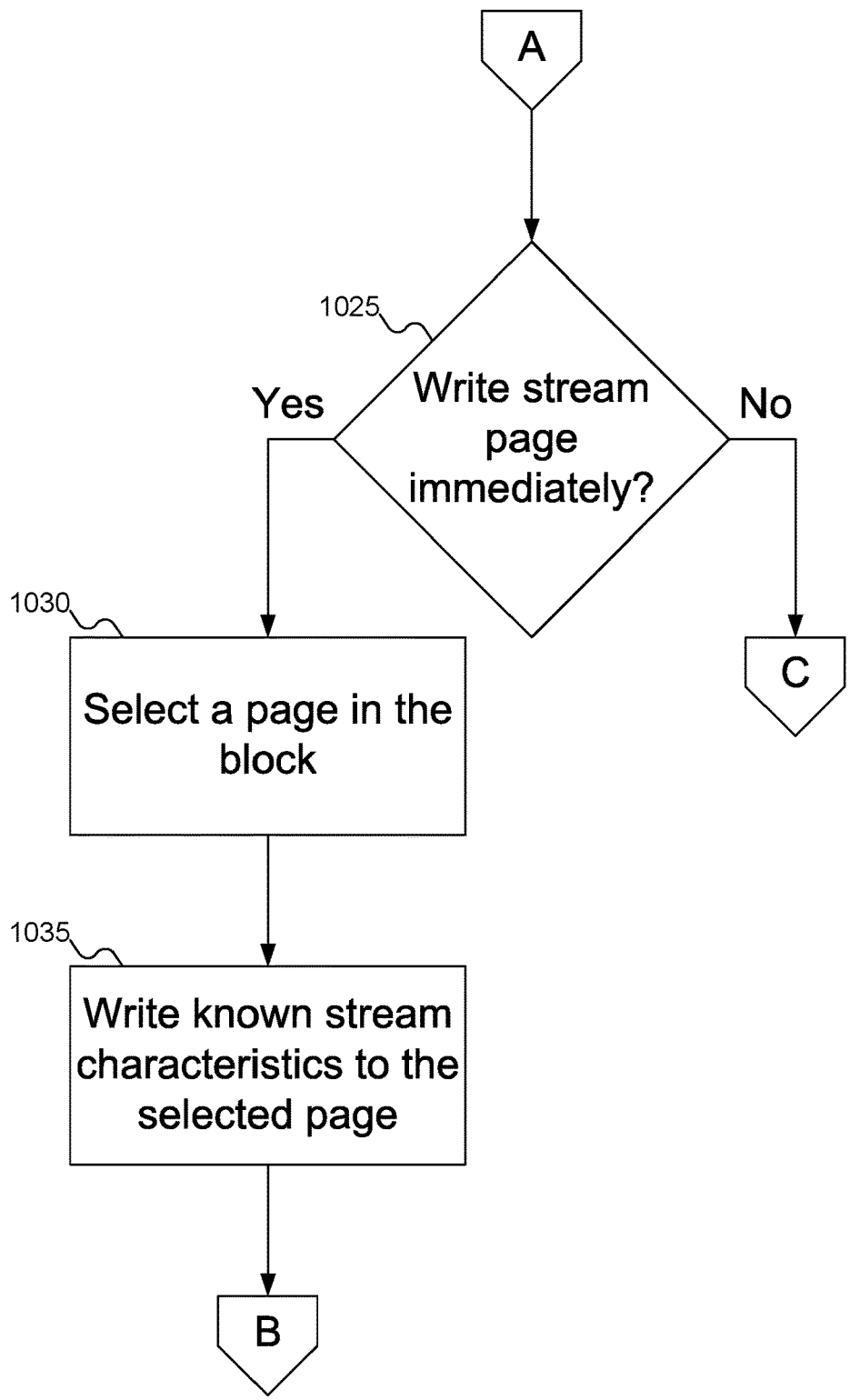
Figure 10C:
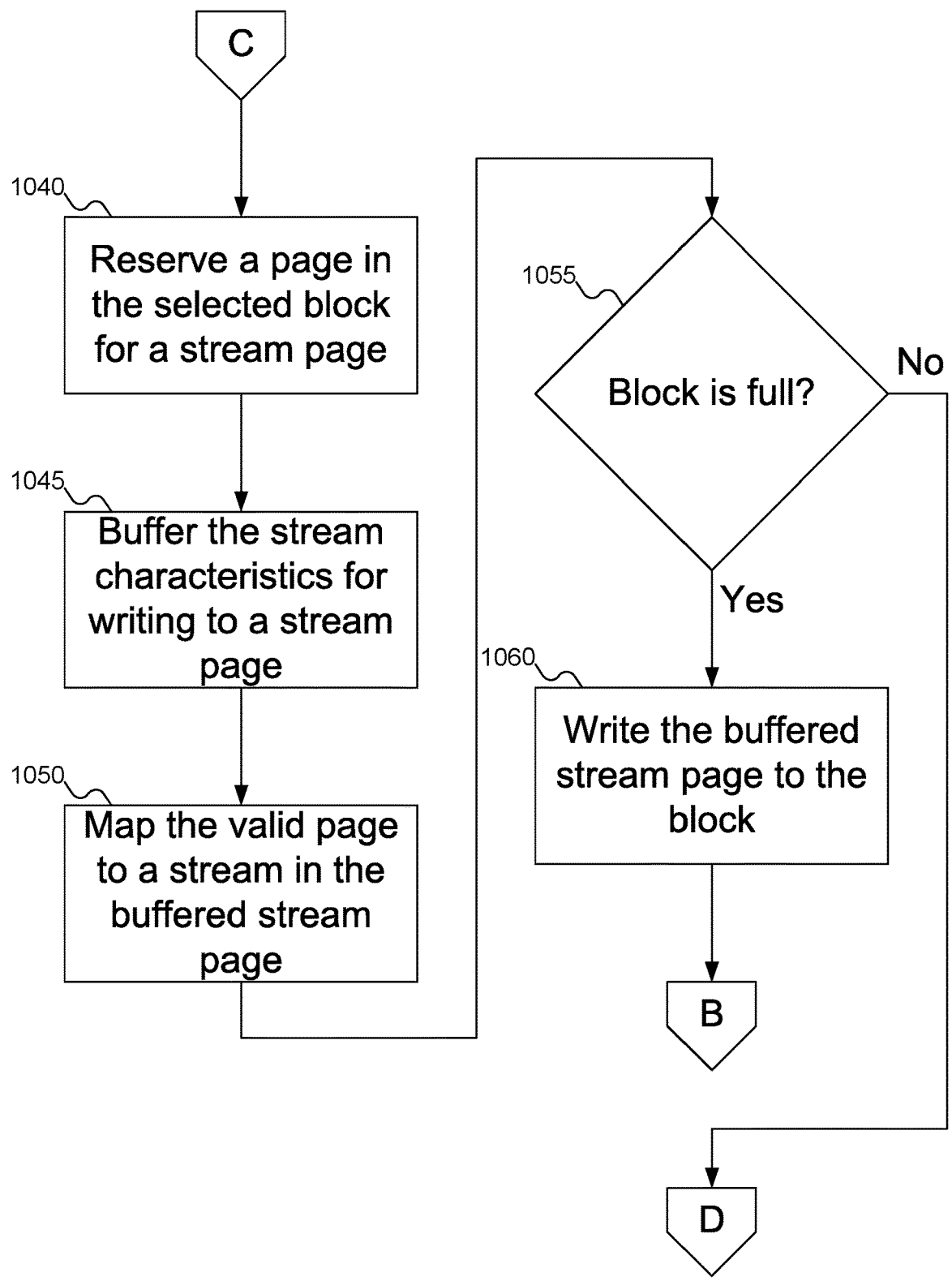

FIGS. 10A-10C show a flowchart of an example procedure to write data to SSD 120 of FIG. 1 and store stream information, according to an embodiment of the inventive concept. In FIG. 10A, at block 1005, SSD 120 of FIG. 1 may receive data 310 of FIG. 3 and stream ID 315 of FIG. 3, as part of write request 305 of FIG. 3 from machine 105 of FIG. 1. At block 1010, SSD 120 of FIG. 1 may select block 505-525 of FIG. 5 in which to write data 310 of FIG. 3 as a page (such as valid page 530 of FIG. 5). At block 1015, SSD 120 of FIG. 1 may write data 310 of FIG. 3 to the selected page in the selected block.

At this point, different options exist, depending on which embodiment of the inventive concept is being used. In one embodiment of the inventive concept, at block 1020, stream logic 435 of FIG. 8 may update either logical address-to-stream ID table 805 or chunk-to-stream ID table 820, to map the logical address (directly or indirectly via the chunk) to stream ID 315 of FIG. 3, after which processing ends.

In other embodiments of the inventive concept, stream page 645 of FIG. 6 may be stored within the selected block. In such embodiments, at block 1025 (FIG. 10B), stream logic 435 of FIG. 8 may determine whether stream characteristics 605 of FIG. 6 are to be written to stream page 645 of FIG. 6 immediately, or whether stream characteristics 605 of FIG. 6 are to be buffered in buffer 825 of FIG. 8. If stream characteristics 605 of FIG. 6 are to be written to stream page 645 of FIG. 6 in the selected block immediately, then at block 1030 stream logic 435 of FIG. 8 may select a page in block 505-525 of FIG. 5 in which to write stream characteristics 605 of FIG. 6, and at block 1035, stream logic 435 of FIG. 8 may write stream characteristics 605 of FIG. 6 to stream page 645 of FIG. 6 in block 505-525 of FIG. 5. In embodiments of the inventive concept where stream characteristics 605 of FIG. 6 are written immediately to block 505-525 of FIG. 5, all the pages in block 505-525 of FIG. 5 store data associated with the same stream, so there is no need to map individual pages to individual streams. But if block 505-525 of FIG. 5 is expected to store data associated with more than one stream, a page-to-stream mapping may be stored within stream page 645 of FIG. 6 when written to block 505-525 of FIG. 5. For example, when block 505-525 of FIG. 5 is first allocated to store data, it might be allocated to store data associated with multiple streams, and this fact might be known at the time of allocation. In that case, stream page 645 of FIG. 6 may be stored immediately in block 505-525 of FIG. 5 as described in block 1035, and stream page 645 of FIG. 6 may store stream characteristics 605 of FIG. 6 for all streams with data stored in block 505-525 of FIG. 5.

On the other hand, if stream logic 435 of FIG. 8 buffers stream characteristics 605 of FIG. 6 in buffer 825 of FIG. 8, then at block 1040 (FIG. 10C), stream logic 435 of FIG. 8 may reserve a page in block 505-525 of FIG. 5 to store stream page 645 of FIG. 6. At block 1045, buffer 825 of FIG. 8 may store stream characteristics 605 of FIG. 6 until all streams with data to be written to block 505-525 of FIG. 5 have been written to the block. At block 1050, stream logic 435 of FIG. 8 may then map the page to the stream in stream page 645 of FIG. 6 as stored in buffer 825 of FIG. 8.

At block 1055, stream logic 435 of FIG. 8 may check to see if block 505-525 of FIG. 5 is full. If not, then processing may return to block 1005 of FIG. 10A to receive the next request from machine 105 of FIG. 1. Otherwise, at block 1060, stream logic 435 of FIG. 8 may write stream page 645 of FIG. 6, as stored in buffer 825 of FIG. 8, to block 505-525 of FIG. 5 as stream page 645 of FIG. 6 (in the reserved page), after which processing ends.

Figure 11:
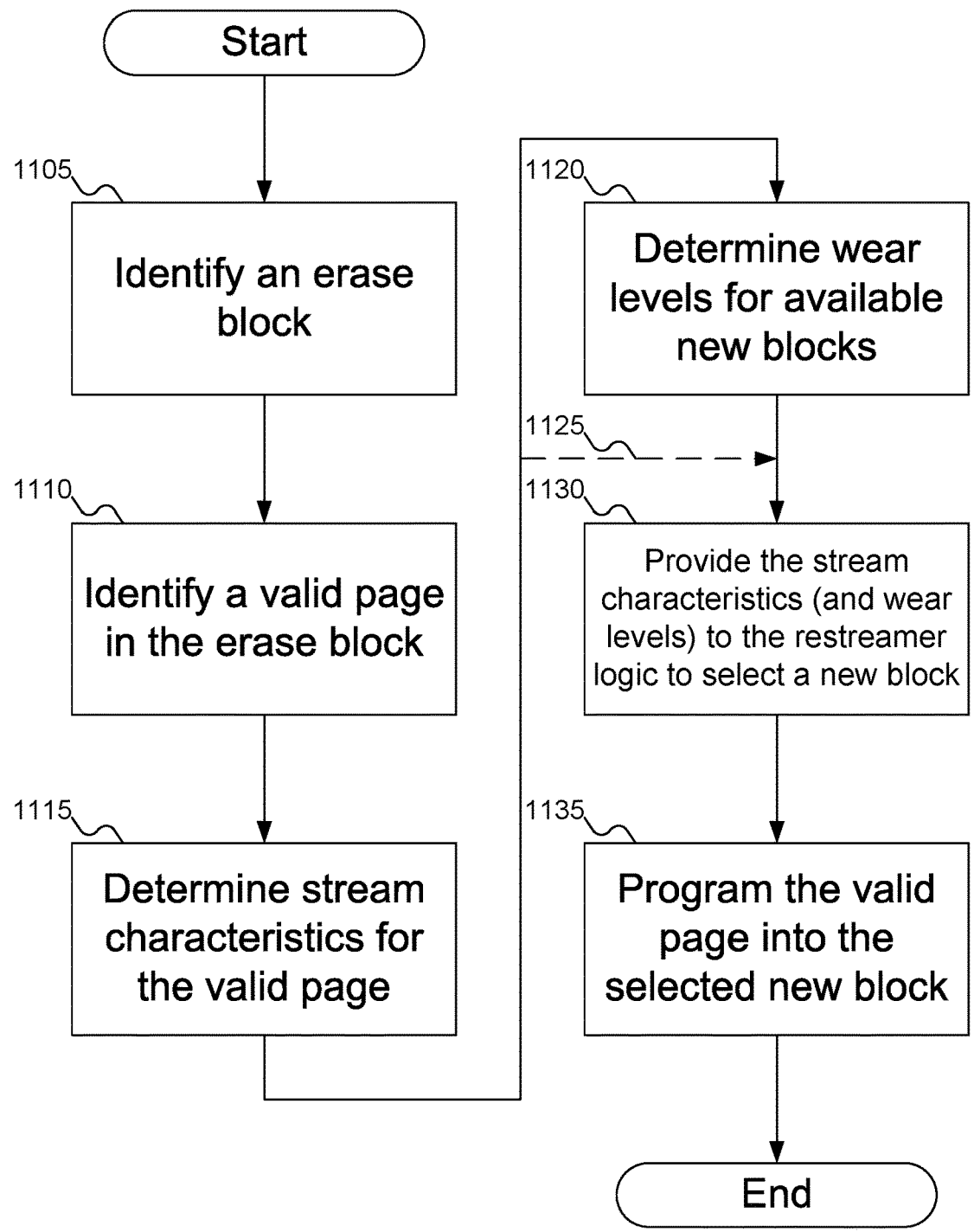
FIG. 11 shows a flowchart of an example procedure to use stored stream information when performing garbage collection on the SSD of FIG. 1 and programming a valid page, according to an embodiment of the inventive concept.

FIG. 11 shows a flowchart of an example procedure to use stored stream information when performing garbage collection on SSD 120 of FIG. 1 and programming valid page 530 of FIG. 5, according to an embodiment of the inventive concept. In FIG. 11, at block 1105, garbage collection logic 430 of FIG. 4 may identify erase block 520 of FIG. 5. At block 1110, garbage collection logic 430 of FIG. 4 may identify valid page 530 of FIG. 5 in block 520 of FIG. 5. At block 1115, stream logic 435 of FIG. 4 may identify stream characteristics 605 of FIG. 6 for valid page 530 of FIG. 5.

At block 1120, wear level determiner 905 of FIG. 9 may determine the wear levels of blocks 520-525 of FIG. 5 in SSD 120 of FIG. 1. Wear level determiner 905 of FIG. 9 may operate by accessing a counter that tracks the number of program and erase cycles for blocks 505-525 of FIG. 5. Block 1120 may be omitted, as shown by dashed arrow 1125.

At block 1130, restreamer logic 440 of FIG. 4 may use stream characteristics 605 of FIG. 6, and the wear levels of blocks 505-525 of FIG. 5 if desired, to select new block 525 of FIG. 5 in which to program valid page 530 of FIG. 5. At block 1135, garbage collection logic 430 of FIG. 4 may then program valid page 530 of FIG. 5 into selected new block 525 of FIG. 5.

Figure 12:
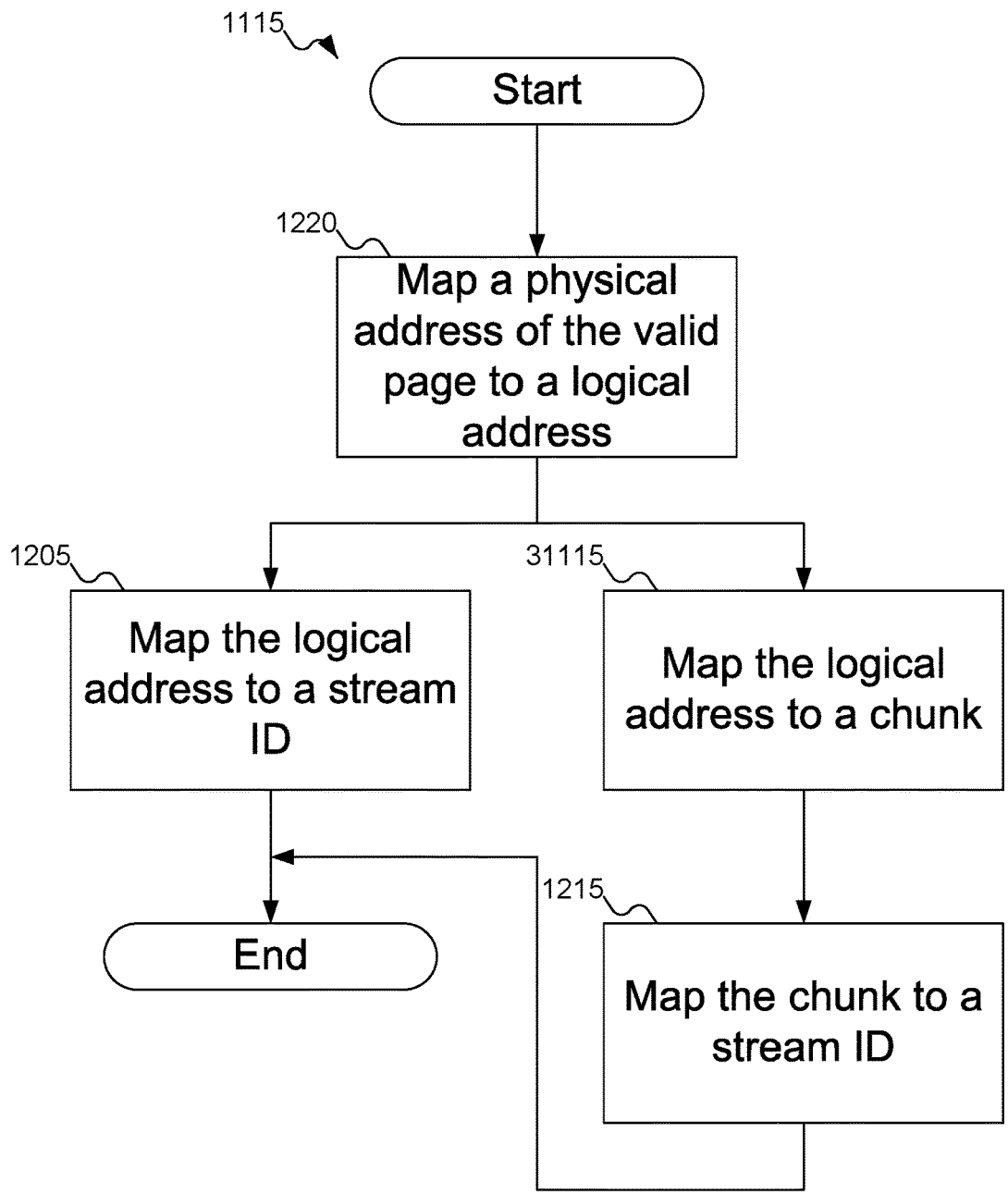
FIG. 12 shows a flowchart of an example procedure to determine the stream identifier (ID) for a valid page in the SSD of FIG. 1 that is being programmed during garbage collection, according to an embodiment of the inventive concept.

FIG. 12 shows a flowchart of an example procedure to determine the stream identifier (ID) for valid page 530 of FIG. 5 in SSD 120 of FIG. 1 that is being programmed during garbage collection, according to an embodiment of the inventive concept. In FIG. 12, at block 1105, flash translation layer 425 of FIG. 7 may use LBA-to-PBA table 705 to map the physical address of valid page 530 of FIG. 5 to an LBA. If stream logic 435 of FIG. 8 uses logical address-to-stream ID table 805, then at block 1205, stream logic 435 of FIG. 8 may use logical address-to-stream ID table 805 to determine stream ID 315 of FIG. 3 associated with the LBA. Otherwise, at block 1210, stream logic 435 of FIG. 8 may make the LBA to a chunk, and at block 1215, stream logic 435 of FIG. 8 may use chunk-to-stream ID table 820 to determine stream ID 315 of FIG. 3 associated with the chunk.

Figure 13:
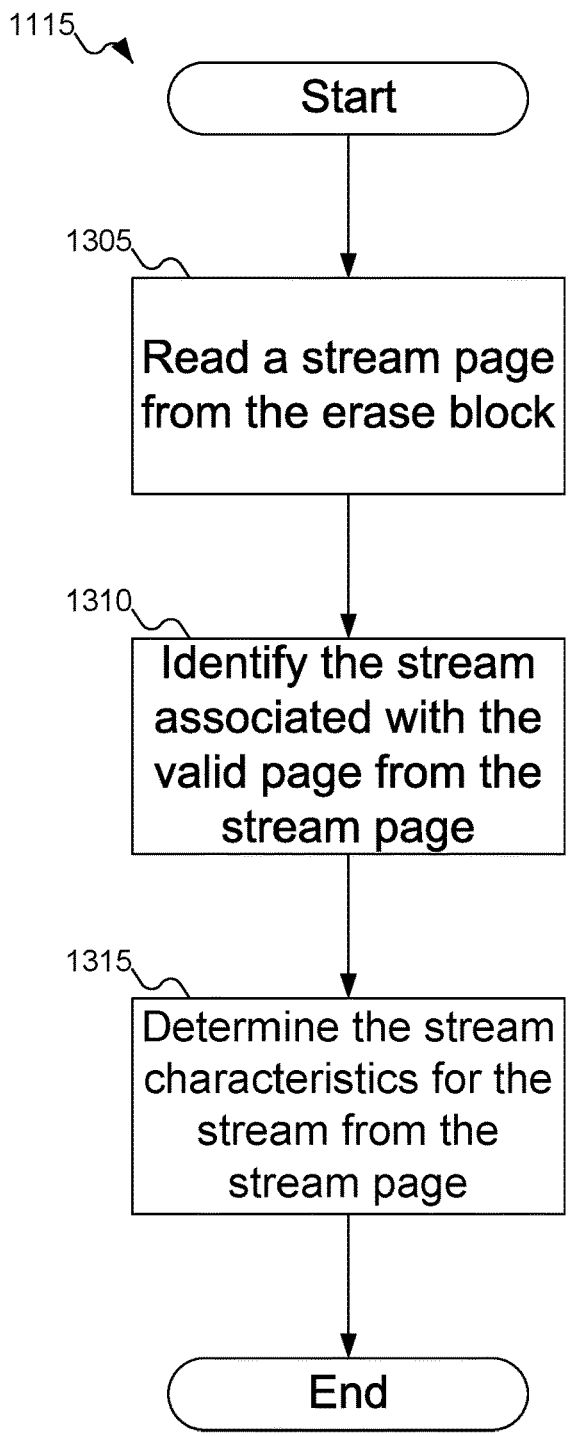
FIG. 13 shows a flowchart of an example procedure to read stream characteristics from a stream page for use in programming a valid page in the SSD of FIG. 1 during garbage collection, according to an embodiment of the inventive concept.

FIG. 13 shows a flowchart of an example procedure to read stream characteristics 605 of FIG. 6 from stream page 645 of FIG. 6 for use in programming valid page 530 of FIG. 36 in SSD 120 of FIG. 1 during garbage collection, according to an embodiment of the inventive concept. In FIG. 13, at block 1305, stream logic 435 of FIG. 4 may read stream page 645 of FIG. 6 from block 520 of FIG. 5. At block 1310, stream logic 435 of FIG. 4 may determine which stream is associated with valid page 530 of FIG. 5. At block 1315, stream logic 435 of FIG. 4 may determine stream characteristics 605 of FIG. 6 for valid page 530 of FIG. 5 from stream page 645 of FIG. 6.

In FIGS. 10A-13, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
  storage for data;
  a host interface logic to receive Input/Output (I/O) requests from a host machine; and
  an SSD controller to manage reading data from and writing data to the storage responsive to the I/O requests, the SSD controller including:
    a flash translation layer to translate logical addresses in the I/O requests to physical addresses in the storage;
    a garbage collection logic to perform garbage collection on an erase block, the erase block including a valid page containing valid data;
    a stream logic to manage stream characteristics for the valid data written in the I/O requests to the storage; and
    a restreamer logic to assign the valid page to a new block responsive to the stream characteristics for the valid data.

Statement 2. An embodiment of the inventive concept includes an SSD according to statement 1, wherein:
  the stream logic includes a logical block address to stream identifier (ID) table to map a logical address associated with the valid data to a stream ID; and
  the restreamer logic is operative to assign the valid page to the new block responsive to the stream ID.

Statement 3. An embodiment of the inventive concept includes an SSD according to statement 2, wherein the logical block address to stream ID table includes a chunk to stream ID table to map a chunk associated with the logical address associated with the valid data to the stream ID.

Statement 4. An embodiment of the inventive concept includes an SSD according to statement 1, wherein the restreamer logic is operative to read the stream characteristics in a stream page in the erase block.

Statement 5. An embodiment of the inventive concept includes an SSD according to statement 1, wherein the stream characteristics include at least one of the stream ID, an expected lifetime of the valid page, a stream allocation timestamp, a block allocation timestamp for the erase block, a sequentiality indicator, a typical I/O size, a Quality of Service (QoS) requirement for a stream identified by the stream ID, and a required isolation level.

Statement 6. An embodiment of the inventive concept includes an SSD according to statement 1, wherein the stream logic includes a buffer to store the stream characteristics associated with the stream ID until the erase block is full.

Statement 7. An embodiment of the inventive concept includes an SSD according to statement 6, wherein the buffer is operative to store a plurality of stream characteristics associated with a plurality of stream IDs for pages in the erase block.

Statement 8. An embodiment of the inventive concept includes an SSD according to statement 7, wherein a stream page maps the pages in the erase block to at least one of the plurality of stream IDs.

Statement 9. An embodiment of the inventive concept includes an SSD according to statement 1, wherein:
  the restreamer logic includes a wear level determiner to determine a plurality of wear levels for a plurality of new blocks; and
  the restreamer logic is operative to assign the valid page to the new block responsive to the stream characteristics for the valid data and the plurality of wear levels for the plurality of new blocks.

Statement 10. An embodiment of the inventive concept includes a method, comprising:
  identifying an erase block in a Solid State Drive (SSD) for garbage collection;
  identifying a valid page in the erase block containing valid data;
  determining stream characteristics for the valid page, the stream characteristics stored on the SSD; and
  using the stream characteristics to program the valid page to a new block in the SSD.

Statement 11. An embodiment of the inventive concept includes a method according to statement 10, wherein:
  determining stream characteristics for the valid page, the stream characteristics stored on the SSD includes:
    mapping a physical address of the valid page to a logical address; and
    mapping the logical address to a stream identifier (ID); and
  using the stream characteristics to program the valid page to a new block in the SSD includes using the stream ID to program the valid page to the new block in the SSD.

Statement 12. An embodiment of the inventive concept includes a method according to statement 11, wherein:
  mapping a physical address of the valid page to a logical address includes mapping the physical address of the valid page to the logical address using a flash translation table; and
  mapping the logical address to a stream ID includes mapping the logical address to the stream ID using a logical block address to stream ID table.

Statement 13. An embodiment of the inventive concept includes a method according to statement 11, wherein:
mapping a physical address of the valid page to a logical address includes mapping the physical address of the valid page to the logical address using a flash translation table; and
mapping the logical address to a stream ID includes:
mapping the logical address to a chunk; and
mapping the chunk to the stream ID using a chunk to stream ID table.

Statement 14. An embodiment of the inventive concept includes a method according to statement 13, wherein mapping the logical address to a chunk includes determining the chunk using a set of most significant bits in the logical address.

Statement 15. An embodiment of the inventive concept includes a method according to statement 11, wherein using the stream ID to program the valid page to the new block in the SSD includes providing the stream ID with the valid page to a restreamer logic to select the new block in the SSD.

Statement 16. An embodiment of the inventive concept includes a method according to statement 10, wherein determining stream characteristics for the valid page, the stream characteristics stored on the SSD includes reading the stream characteristics from a stream page in the erase block.

Statement 17. An embodiment of the inventive concept includes a method according to statement 16, wherein the stream characteristics include at least one of the stream ID, an expected lifetime of the valid page, a stream allocation timestamp, a block allocation timestamp for the erase block, a sequentiality indicator, a typical Input/Output (I/O) size, a Quality of Service (QoS) requirement for a stream identified by the stream ID, and a required isolation level.

Statement 18. An embodiment of the inventive concept includes a method according to statement 16, wherein the stream page is written to the erase block around the same time that the valid page is written to the block.

Statement 19. An embodiment of the inventive concept includes a method according to statement 16, wherein using the stream characteristics to program the valid page to a new block in the SSD includes providing the stream characteristics with the valid page to a restreamer logic to select the new block in the SSD.

Statement 20. An embodiment of the inventive concept includes a method according to statement 10, wherein using the stream characteristics to program the valid page to a new block in the SSD includes:
determining a plurality of wear levels for a plurality of blocks; and
selecting the new block responsive to the plurality of wear levels for the plurality of blocks and the stream characteristics.

Statement 21. An embodiment of the inventive concept includes a method according to statement 20, wherein selecting the new block responsive to the plurality of wear levels for the plurality of blocks and the stream characteristics includes:
selecting the new block for data with a longer lifetime if the corresponding wear level for the new block is high; and
selecting the new block for data with a shorter lifetime if the corresponding wear level for the new block is low.

Statement 22. An embodiment of the inventive concept includes a method, comprising: receiving data from a host machine;
selecting a block to write the data using a stream ID for the data;
writing the data in a valid page in the block; and
storing stream characteristics associated with the stream ID for the data.

Statement 23. An embodiment of the inventive concept includes a method according to statement 22, wherein receiving data from a host machine includes receiving the data and the stream ID from the host machine.

Statement 24. An embodiment of the inventive concept includes a method according to claim 22, wherein selecting a block to write the data includes generating the stream ID for the data using an auto-stream logic.

Statement 25. An embodiment of the inventive concept includes a method according to statement 22, wherein storing stream characteristics associated with a stream ID for the data includes associating the stream ID with a logical address associated with the valid page in a logical block address to stream ID table.

Statement 26. An embodiment of the inventive concept includes a method according to statement 25, wherein associating the stream ID with a logical address associated with the valid page in a logical block address to stream ID table includes associating the stream ID with a chunk associated with the valid page in a chunk to stream ID table.

Statement 27. An embodiment of the inventive concept includes a method according to statement 22, wherein storing stream characteristics associated with a stream ID for the data includes writing a stream page to the block, the stream page including the stream characteristics associated with the stream ID.

Statement 28. An embodiment of the inventive concept includes a method according to statement 27, wherein the stream characteristics include at least one of the stream ID, an expected lifetime of the valid page, a stream allocation timestamp, a block allocation timestamp for the erase block, a sequentiality indicator, a typical Input/Output (I/O) size, a Quality of Service (QoS) requirement for a stream identified by the stream ID, and a required isolation level.

Statement 29. An embodiment of the inventive concept includes a method according to statement 27, wherein:
selecting a block to write the data includes reserving the stream page in the block; and
writing a stream page to the block includes:
buffering the stream page until the block is full; and
writing the stream page to the block when the block is full.

Statement 30. An embodiment of the inventive concept includes a method according to statement 29, wherein buffering the stream page until the block is full includes buffering multiple stream characteristics associated with a plurality of stream IDs for pages in the block.

Statement 31. An embodiment of the inventive concept includes a method according to statement 30, wherein writing the stream page to the block when the block is full includes mapping, in the stream page, the pages in the block to at least one of the plurality of stream IDs.

Statement 32. An embodiment of the inventive concept includes an article, comprising a non-transitory storage medium, the non-transitory storage medium having stored thereon instructions that, when executed by a machine, result in:
identifying an erase block in a Solid State Drive (SSD) for garbage collection;
identifying a valid page in the erase block containing valid data;
determining stream characteristics for the valid page, the stream characteristics stored on the SSD; and
using the stream characteristics to program the valid page to a new block in the SSD.

Statement 33. An embodiment of the inventive concept includes an article according to statement 32, wherein:
determining stream characteristics for the valid page, the stream characteristics stored on the SSD includes:
mapping a physical address of the valid page to a logical address; and
mapping the logical address to a stream identifier (ID); and
using the stream characteristics to program the valid page to a new block in the SSD includes using the stream ID to program the valid page to the new block in the SSD.

Statement 34. An embodiment of the inventive concept includes an article according to statement 33, wherein:
mapping a physical address of the valid page to a logical address includes mapping the physical address of the valid page to the logical address using a flash translation table; and
mapping the logical address to a stream ID includes mapping the logical address to the stream ID using a logical block address to stream ID table.

Statement 35. An embodiment of the inventive concept includes an article according to statement 33, wherein:
mapping a physical address of the valid page to a logical address includes mapping the physical address of the valid page to the logical address using a flash translation table; and
mapping the logical address to a stream ID includes:
mapping the logical address to a chunk; and
mapping the chunk to the stream ID using a chunk to stream ID table.

Statement 36. An embodiment of the inventive concept includes an article according to statement 35, wherein mapping the logical address to a chunk includes determining the chunk using a set of most significant bits in the logical address.

Statement 37. An embodiment of the inventive concept includes an article according to statement 33, wherein using the stream ID to program the valid page to the new block in the SSD includes providing the stream ID with the valid page to a restreamer logic to select the new block in the SSD.

Statement 38. An embodiment of the inventive concept includes an article according to statement 32, wherein determining stream characteristics for the valid page, the stream characteristics stored on the SSD includes reading the stream characteristics from a stream page in the erase block.

Statement 39. An embodiment of the inventive concept includes an article according to statement 38, wherein the stream characteristics include at least one of the stream ID, an expected lifetime of the valid page, a stream allocation timestamp, a block allocation timestamp for the erase block, a sequentiality indicator, a typical Input/Output (I/O) size, a Quality of Service (QoS) requirement for a stream identified by the stream ID, and a required isolation level.

Statement 40. An embodiment of the inventive concept includes an article according to statement 38, wherein the stream page is written to the erase block around the same time that the valid page is written to the block.

Statement 41. An embodiment of the inventive concept includes an article according to statement 38, wherein using the stream characteristics to program the valid page to a new block in the SSD includes providing the stream characteristics with the valid page to a restreamer logic to select the new block in the SSD.

Statement 42. An embodiment of the inventive concept includes an article according to statement 32, wherein using the stream characteristics to program the valid page to a new block in the SSD includes:
determining a plurality of wear levels for a plurality of blocks; and
selecting the new block responsive to the plurality of wear levels for the plurality of blocks and the stream characteristics.

Statement 43. An embodiment of the inventive concept includes an article according to statement 42, wherein selecting the new block responsive to the plurality of wear levels for the plurality of blocks and the stream characteristics includes:
selecting the new block for data with a longer lifetime if the corresponding wear level for the new block is high; and
selecting the new block for data with a shorter lifetime if the corresponding wear level for the new block is low.

Statement 44. An embodiment of the inventive concept includes an article, comprising a non-transitory storage medium, the non-transitory storage medium having stored thereon instructions that, when executed by a machine, result in:
receiving data from a host machine;
selecting a block to write the data using a stream ID for the data;
writing the data in a valid page in the block; and
storing stream characteristics associated with the stream ID for the data.

Statement 45. An embodiment of the inventive concept includes an article according to statement 44, wherein receiving data from a host machine includes receiving the data and the stream ID from the host machine.

Statement 46. An embodiment of the inventive concept includes an article according to claim 42, wherein selecting a block to write the data includes generating the stream ID for the data using an auto-stream logic.

Statement 47. An embodiment of the inventive concept includes an article according to statement 44, wherein storing stream characteristics associated with a stream ID for the data includes associating the stream ID with a logical address associated with the valid page in a logical block address to stream ID table.

Statement 48. An embodiment of the inventive concept includes an article according to statement 47, wherein associating the stream ID with a logical address associated with the valid page in a logical block address to stream ID table includes associating the stream ID with a chunk associated with the valid page in a chunk to stream ID table.

Statement 49. An embodiment of the inventive concept includes an article according to statement 44, wherein storing stream characteristics associated with a stream ID for the data includes writing a stream page to the block, the stream page including the stream characteristics associated with the stream ID.

Statement 50. An embodiment of the inventive concept includes an article according to statement 49, wherein the stream characteristics include at least one of the stream ID, an expected lifetime of the valid page, a stream allocation timestamp, a block allocation timestamp for the erase block, a sequentiality indicator, a typical Input/Output (I/O) size, a Quality of Service (QoS) requirement for a stream identified by the stream ID, and a required isolation level.

Statement 51. An embodiment of the inventive concept includes an article according to statement 49, wherein:
selecting a block to write the data includes reserving the stream page in the block; and
writing a stream page to the block includes:
buffering the stream page until the block is full; and
writing the stream page to the block when the block is full.

Statement 52. An embodiment of the inventive concept includes an article according to statement 51, wherein buffering the stream page until the block is full includes buffering multiple stream characteristics associated with a plurality of stream IDs for pages in the block.

Statement 53. An embodiment of the inventive concept includes an article according to statement 52, wherein writing the stream page to the block when the block is full includes mapping, in the stream page, the pages in the block to at least one of the plurality of stream IDs.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A Solid State Drive (SSD), comprising:
storage for data;
a host interface logic to receive Input/Output (I/O) requests from a host machine, the I/O requests including a first I/O request associated with a first stream identifier (ID) assigned by the host machine and a second I/O request associated with a second stream ID assigned by the host machine; and
an SSD controller to manage reading data from and writing data to the storage responsive to the I/O requests, the SSD controller including:
a flash translation layer to translate logical addresses in the I/O requests to physical addresses in the storage;
a garbage collection logic to perform garbage collection on an erase block, the erase block including a valid page containing valid data associated with the first stream ID;
a stream logic to manage stream characteristics for the valid data written in the I/O requests to the storage; and
a restreamer logic to assign the valid page to a new block responsive to the stream characteristics for the valid data, the restreamer logic capable of assigning the valid page to the second stream ID, the second stream ID different from the first stream ID.

2. An SSD according to claim 1, wherein:
the stream logic includes a logical block address to stream ID table to map a logical address associated with the valid data to the first stream ID; and
the restreamer logic is operative to assign the valid page to the new block responsive to the first stream ID.

3. An SSD according to claim 2, wherein the logical block address to stream ID table includes a chunk to stream ID table to map a chunk associated with the logical address associated with the valid data to the first stream ID.

4. An SSD according to claim 1, wherein the restreamer logic is operative to read the stream characteristics in a stream page in the erase block.

5. An SSD according to claim 1, wherein the stream logic includes a buffer to store the stream characteristics associated with the first stream ID until the erase block is full, wherein the buffer is not part of the erase block.

6. An SSD according to claim 5, wherein the buffer is operative to store at least two stream characteristics associated with at least two stream IDs for pages in the erase block.

7. An SSD according to claim 6, wherein a stream page maps the pages in the erase block to at least one of the at least two stream IDs.

8. An SSD according to claim 1, wherein:
the restreamer logic includes a wear level determiner to determine at least two wear levels for at least two new blocks, the wear level determiner including at least a processor; and
the restreamer logic is operative to assign the valid page to the new block responsive to the stream characteristics for the valid data and the at least two wear levels for the at least two new blocks.

9. A method, comprising:
identifying an erase block in a Solid State Drive (SSD) for garbage collection;
identifying a valid page in the erase block containing valid data;
reading stream characteristics for the valid page from the SSD;
selecting a first stream ID for the valid page responsive to the stream characteristics, the first stream ID being different from a second stream ID assigned to the valid page when the valid page was previously written to the SSD, the first stream ID associated with a second valid page previously written to the SSD by a host machine; and
using the first stream ID to program the valid page to a new block in the SSD,
wherein the stream characteristics are determined, at least in part, at a time when the valid page was written to the erase block responsive to an Input/Output (I/O) request from the host machine.

10. A method according to claim 9, wherein reading stream characteristics for the valid page from the SSD includes:
mapping a physical address of the valid page to a logical address; and
mapping the logical address to a stream identifier (ID).

11. A method according to claim 10, wherein:
mapping a physical address of the valid page to a logical address includes mapping the physical address of the valid page to the logical address using a flash translation table; and
mapping the logical address to a stream ID includes:
mapping the logical address to a chunk; and
mapping the chunk to the stream ID using a chunk to stream ID table.

12. A method according to claim 10, wherein using the stream ID to program the valid page to the new block in the SSD includes providing the stream ID with the valid page to a restreamer logic to select the new block in the SSD.

13. A method according to claim 9, wherein reading stream characteristics for the valid page from the SSD includes reading the stream characteristics from a stream page in the erase block.

14. A method according to claim 13, wherein using the first stream ID to program the valid page to a new block in the SSD includes providing the first stream ID with the valid page to a restreamer logic to select the new block in the SSD.

15. A method according to claim 9, wherein selecting a first stream ID for the valid page responsive to the stream characteristics includes:
determining at least two wear levels for at least two blocks; and
selecting the first stream ID responsive to the at least two wear levels for the at least two blocks and the stream characteristics.

16. A method according to claim 9, wherein the valid page was previously written to the erase block, before identifying the erase block in SSD for garbage collection, responsive to a stream ID assigned by the host machine.

\* \* \* \* \*